United States Patent [19]

Bloomberg

[11] Patent Number: 5,765,176
[45] Date of Patent: Jun. 9, 1998

[54] PERFORMING DOCUMENT IMAGE MANAGEMENT TASKS USING AN ICONIC IMAGE HAVING EMBEDDED ENCODED INFORMATION

[75] Inventor: Dan S. Bloomberg, Palo Alto, Calif.

[73] Assignee: Xerox Corporation, Stamford, Conn.

[21] Appl. No.: 709,055

[22] Filed: Sep. 6, 1996

[51] Int. Cl.$^6$ ........................................... G06T 3/00
[52] U.S. Cl. .................. 707/514; 707/529; 707/530; 345/348; 345/349; 345/350
[58] Field of Search ........................ 707/501, 511, 707/512, 513, 514, 515, 517, 526, 527, 529, 530; 345/335, 334, 349, 350; 382/175, 176, 180; 358/403, 401, 448; 235/454, 494

[56] References Cited

U.S. PATENT DOCUMENTS

| | | | |
|---|---|---|---|
| 4,716,438 | 12/1987 | Farrell | 399/84 |
| 4,728,984 | 3/1988 | Daniele | 358/300 |
| 4,786,940 | 11/1988 | Daniele | 347/129 |
| 4,908,873 | 3/1990 | Philibert et al. | 382/100 |
| 5,060,980 | 10/1991 | Johnson et al. | 283/70 |
| 5,091,966 | 2/1992 | Bloomberg et al. | 382/203 |
| 5,128,525 | 7/1992 | Stearns et al. | 235/454 |
| 5,161,213 | 11/1992 | Knowlton | 345/428 |
| 5,168,147 | 12/1992 | Bloomberg | 235/456 |
| 5,221,833 | 6/1993 | Hecht | 235/494 |
| 5,245,165 | 9/1993 | Zhang | 235/454 |
| 5,278,400 | 1/1994 | Appel | 235/454 |
| 5,315,098 | 5/1994 | Tow | 235/494 |
| 5,367,626 | 11/1994 | Morioka et al. | 345/348 |
| 5,444,779 | 8/1995 | Daniele | 380/3 |
| 5,448,375 | 9/1995 | Cooper et al. | 358/403 |
| 5,449,895 | 9/1995 | Hecht et al. | 235/494 |
| 5,459,307 | 10/1995 | Klotz, Jr. | 235/454 |
| 5,485,563 | 1/1996 | Fisher | 345/439 |
| 5,486,686 | 1/1996 | Zdybel, Jr. et al. | 235/375 |
| 5,506,697 | 4/1996 | Li et al. | 358/448 |
| 5,561,753 | 10/1996 | Coulombe et al. | 345/326 |
| 5,611,031 | 3/1997 | Hertzfeld et al. | 345/433 |
| 5,638,504 | 6/1997 | Scott et al. | 707/530 |
| 5,680,636 | 10/1997 | Levine et al. | 707/500 |
| 5,713,019 | 1/1998 | Keaten | 707/10 |

OTHER PUBLICATIONS

Brassil et al., "Electronic Marking and Identification Techniques to Discourage Document Copying", *IEEE Journal on Selected Areas in Communications*, vol. 12, No. 8, Oct. 1995, pp. 1495–1504.

(List continued on next page.)

*Primary Examiner*—Joseph H. Feild
*Assistant Examiner*—Stephen Hong

[57] ABSTRACT

Encoded data embedded in an iconic, or reduced size, version of an original text image is decoded and used in a variety of document image management applications to provide input to, or to control the functionality of, an application. The iconic image may be printed in a suitable place (e.g., the margin or other background region) in the original text image so that a text image so annotated will then always carry the embedded data in subsequent copies made from the annotated original. The iconic image may also be used as part of a graphical user interface as a surrogate for the original text image. An encoding operation encodes the data unobtrusively in the form of rectangular blocks that have a foreground color and size dimensions proportional to the iconic image so that when placed in the iconic image in horizontal lines, the blocks appear to a viewer to be representative of the text portion of the original image that they replace. Several embodiments are illustrated, including using the iconic image as a document surrogate for the original text image for data base retrieval operations. The iconic image may also be used in conjunction with the original text image for purposes of authenticating the original document using a digital signature encoded in the iconic image, or for purposes of controlling the authorized distribution of the document. The iconic image may also carry data about the original image that may be used to enhance the performance and accuracy of a subsequent character recognition operation.

12 Claims, 20 Drawing Sheets

OTHER PUBLICATIONS

D.S. Bloomberg, "Multiresolution morphological analysis of document images", *SPIE Conf. 1818, Visual Communications and Image Processing '92*, Boston, MA, Nov. 1992, pp. 648–662.

Mark Peairs, "Iconic Paper", *Proccedings of the International Conference on Document Analysis and Recognition*, Montreal, Canada, Sep. 1995, pp. 1174–1179.

Kermit Norris, "Channel Capacity of Charge–Constrained Run–Length Limited Codes", *IEEE Transactions on Magnetics*, vol. Mag. 17, No. 6, Nov. 1981, pp. 3452–3455.

Story et al., "The RightPages Image–Based Electronic Library for Alerting and Browsing", *IEEE Computer*, Sep. 1992, pp. 17–26.

Susan Weixel, *Word 6 for Windows Quickstart*, Que Corporation, Indianapolis, IN, 1994, pp. 47–48, 154–155.

Digimarc Corporation, url: www.digimarc.com; Digimarc Announcement, dated Jun. 27, 1995, and Frequently Asked Questions, available and printed form World Wide Web site during Aug., 1996.

Stallings, W., *Network and Internetwork Security Principles and Practice*, Prentic Hall, Englewood Cliffs, N.J., 1995, Section 2.2., Classical Encryption Techniques, pp. 27–28.

O'Gorman, L. and Rabinovich, I., "A Pattern Recognition Approach to Photo–ID Authentication", *International Conference on Pattern Recognition* (ICPR '96), Vienna, Austria, Aug. 1996, (page numbers unavailable).

M. Mansour, "Multi–Tiered Condensed Bar Code", IBM Technical Disclosure Bulletin, vol. 26, No. 2, Jul. 1983, pp. 766–767.

```
72                                                              70
  1001010011010110111011101100011001110110011
  0001011001011011000110011110101001011000100
  1101001011010001001111010100100101000100100
  1011100010010001000111101001111011010110100
  0001101101101010100011101011000110100100110
  ...
```

PERFORMING DOCUMENT IMAGE MANAGEMENT TASKS USING AN ICONIC IMAGE HAVING EMBEDDED ENCODED INFORMATION

CROSS REFERENCE TO RELATED APPLICATIONS

The present invention is related to an invention that is the subject matter of a previously filed, copending, commonly assigned U.S. patent application having the same inventor as the subject application and having the following serial number and title: Application Ser. No. 08/671,423, "Embedding Encoded Information in an Iconic Version of a Text Image". Application Ser. No. 08/671,423 is hereby incorporated by reference herein as if set out in full, and will be subsequently referred to herein as "the Iconic Image Encoding application."

BACKGROUND OF THE INVENTION

The present invention relates generally to a processor-based technique in the field of document image management, and more particularly, to document image management applications that make use of an iconic image version of a document (text) image that includes encoded binary information embedded in the iconic image to perform document image management tasks related to the text image.

A common practice in computer-implemented graphical user interfaces is to use small graphical images called "icons" to represent software applications and functions. The advantages of using icons have been applied to the domain of images, and reduced-size versions of images, often called "thumbnail" images, have been used in several contexts. In a reduced version of an image, the characteristic page layout appearance of the full size page is preserved and objects are proportionally reduced and placed in positions in the thumbnail image that are substantially equivalent to positions in the full size version of the image. The preservation of the page layout features of the full size version of the image, such as the margin dimensions, the placement of headers and footers, the spacing between paragraphs and of lines within paragraphs, the presence or absence of text justification, and the proportional reduction of text in various font sizes, all contribute to producing a thumbnail image which, because of human pattern matching abilities, is easily recognizable to a viewer as representative of the full size image. A reduced sized version of an original image that substantially preserves visually significant page layout features of the full size version of the image will be referred to herein as an iconic version of the original image, or simply as an iconic image.

Iconic images have been used in computer-implemented applications to augment and exploit human memory and pattern matching skills. Story et al., in "The RightPages Image-Based Electronic Library for Alerting and Browsing," in *IEEE Computer*, September 1992, pp. 17–26, discloses a prototype electronic library that provides certain library services to its users. A user interface shows an image area including "stacks" containing reduced-size images of journal covers that users can view in a way analogous to viewing journal covers on library shelves. To examine the contents of a particular journal, the user selects a journal with a mouse, and the system displays an image of the table of contents. In addition to saving display space, the use of thumbnail image versions of the journals' covers exploits the user's familiarity with the appearance of the covers of publications in a particular field of science.

Mark Peairs in "Iconic Paper" in *Proceedings of the International Conference on Document Analysis and Recognition*, Montreal, Canada, 1995, pp. 1174–1179, discloses a technique that uses thumbnail images, referred to as icons, to retrieve documents from an electronic database. The technique provides a physical sheet of paper as a representation that can be used by humans for recognition and by machines for indexing. A document can be accessed by a gesture indicating a particular icon on the page. The technique exploits the pattern matching abilities of the human user using page characteristics of the original image that are still identifiable at the selected reduction scale. To employ the pattern recognition method, a text retrieval operation uses character counts of each word of text in document images to index a table of document identifiers that can then be used to locate the original page or document in a data base. Character positions in an original page of text are determined and a special pixel pattern is positioned on a one-for-one basis in the icon in place of each character in order to preserve the ability to compute character counts of words in the reduced version of the image. During a retrieval operation, an iconic image is selected by a user, the special pixel patterns are located in the iconic image, counts of the lengths of words are made, and the counts converted to an index in the table for retrieving the original image.

Image marking and encoding techniques are used in a wide variety of applications to insert, or embed, encoded information into an image; the embedded information is then subsequently decoded and used for a variety of purposes, some of which include carrying out tasks that can be generally classified as document image management tasks. Bar codes explicitly insert encoded information in an image, and are typically used in applications where the obvious and perceptible presence of the encoded information is not a disadvantage. For example, U.S. Pat. No. 5,506,697 discloses applications for encoding the machine-readable or human-readable content of an original document in one or more two-dimensional bar code symbols; the symbol with the original document, or just the symbol, may then be facsimile transmitted to a remote location where the original document may be regenerated using data decoded from the facsimile-transmitted bar code symbol.

The field of innocuous, or surreptitious, image marking is known as steganography, or "covered writing." Data glyph technology is a category of embedded encoded information that is particularly advantageous for use in applications that require the embedded data to be robust for decoding purposes yet inconspicuous, or even surreptitious, in the resulting image. Data glyph technology encodes digital information in the form of binary 1's and 0's which are then rendered in the form of very small linear marks. Generally, each small mark represents a digit of binary data; whether the particular digit is a digital 1 or 0 depends on the linear orientation of the particular mark. For example, in one embodiment, marks which are oriented from top left to bottom right may represent a 0, while marks oriented from bottom left to top right may represent a 1. The individual marks are of such a size relative to the maximum resolution of a printing device as to produce an overall visual effect to a casual observer of a uniform gray halftone area when a large number of such marks are printed together on paper, and the halftone area in the document, when incorporated in an image border or graphic, does not explicitly suggest that embedded data is present. A viewer of the image could perhaps detect only by very close scrutiny that the small dots forming the gray halftone area are a series of small marks which together bear binary information. U.S. Pat. Nos.

5,091,966, 5,128,525, 5,168,147, 5,221,833, 5,245,165, 5,315,098, and 5,449,895, and U.S. patent application Ser. No. 07/560,514, all assigned to the assignee of the present invention, provide additional information about the uses, encoding and decoding techniques of data glyphs. For example, U.S. Pat. No. 5,315,098, entitled "Methods and Means for Embedding Machine Readable Digital Data in Halftone Images," discloses techniques for encoding digital data in the angular orientation of circularly asymmetric halftone dot patterns that are written into the halftone cells of digital halftone images, and U.S. Pat. No. 5,168,147 by the named inventor herein and entitled "Binary Image Processing for Decoding Self-Clocking Glyph Shape Codes," discloses image processing techniques, including image morphology techniques, for decoding glyph codes embedded in scanned images.

U.S. Pat. No. 5,486,686, assigned to the assignee of the present invention and entitled "Hardcopy Lossless Data Storage and Communications for Electronic Document Processing Systems," discloses an improvement to an electronic document processing system for transferring information back and forth between an electronic domain and a hardcopy domain. An interface means is provided between a computer that operates on and stores electronic document files and a printing device, where the printing device prints on a hardcopy document both the human readable renderings of an electronic document and machine readable attributes of the electronic document. The machine readable attributes are recoverable from the code printed on the hardcopy document when information carried by the document is transformed from the hardcopy domain to the electronic domain, such as for example by scanning the physical document. Data glyphs are disclosed as a way of encoding the machine readable attributes of the electronic document on the hardcopy document. It is disclosed by way of example that all or only selected portions of the ASCII content of the electronic document, the document description language definition of the electronic document, or the printer description language definition of the document may be printed on the hardcopy document. When a sufficient amount of information is encoded, the physical document serves as a lossless data storage mechanism for the electronic document.

U.S. Pat. No. 5,444,779, assigned to the assignee of the present invention and entitled "Electronic Copyright Royalty System Using Glyphs," discloses a system for utilizing a printable yet unobtrusive data glyph or similar two-dimensionally encoded mark to identify copyrighted documents for the purpose of collecting copyright royalties or preventing document reproduction upon decoding of the data glyphs or other encoded marks. In connection with a processor-controlled copier, printing system or advanced reprographic apparatus, the decoded information may be used, for example, to indicate that a copyright fee is payable, or to prevent printing or reproduction of the document. In one embodiment, the data glyph coding indicating the copyright royalty and reproduction information may be updated and newly printed, or new information may be added, on the copy or copies produced by the printing system or reprographic apparatus.

U.S. Pat. No. 5,060,980, assigned to the assignee of the present invention and entitled "Form Utilizing Encoded Indications for Form Field Processing,"discloses a novel type of form document that may include one or more of a variety of types of fields, as well as other non-field information and that carries an encoded description of itself. A form generation process automatically encodes information about the fields as the form is being created, and integrates the encoded information into the electronic and printed representations of the form. The particular encoding scheme used may be any suitable encoding scheme that is able to encode the information compactly enough to allow room on the form for the fields themselves. A form interpreter accepts information from a scanner, locates the encoded information representing the form description in the scanner information, interprets the encoded information, and performs either preprogrammed operations on the information located in specified fields or of a specified data type, or performs operations on that information from instructions encoded with the form description itself.

A related practice in the field of steganography is that of image marking, sometimes referred to as "digital watermarking," analogous to the practice of marking paper with a largely indiscernible design during manufacture. In document marking applications, one or more codewords are embedded in a document image in a manner that is substantially indiscernible to a reader but can be reliably recovered and decoded. For example, using the least significant bit of each pixel in an eight bit per pixel grayscale image to encode a message would cause little or no impact on the appearance of the image, yet a 480 pixel wide by 100 pixel high image could theoretically contain a message of more than 5,000 characters. The same principles apply to audio and video files as well. Moreover, the image can be used simply as a carrier, with the message first being encrypted. In many applications, the goal of concealment of the encoded data is typically an important one in those applications in which the document is being marked so that it may be traced or authenticated.

An example of image marking is disclosed in U.S. Pat. No. 5,278,400, assigned to the assignee of the present invention and entitled "Multiple Threshold Encoding of Machine Readable Code." U.S. Pat. No. 5,278,400 discloses a method and apparatus for applying coded data to a substrate and decoding the data where the data are encoded in uniformly sized groups of pixels, called cells. Each cell is encoded by distinctively marking a certain number of the pixels to represent the code, without regard to the position in the cell of a marked pixel. For example, a cell comprised of six pixels each of which may be marked in black or white provides for seven possible black-white combinations of the pixels in the cell; a series of three cells provides for $7^3$ possible coded combinations, more than enough to encode the 256 character ASCII character set with only 18 pixels. The characteristics of the marking of each cell are preferably the same to facilitate robustness for decoding purposes.

Digimarc Corporation of Portland Oregon markets software for embedding information such as electronic signatures or serial numbers directly within photographs, video, audio, and other creative property. According to company-published information available as of the filing date of this application at www.digimarc.com entitled "Digimarc Corp Announces New Copyright Protection Technology", Jun. 27, 1995 (hereafter, "the Digimarc press release"), a Digimarc™ signature may be used for a wide variety of applications, including verifying copyright ownership, detecting alterations, triggering digital-cash meters, or tracking black-market distribution. The Digimarc press release discloses that the technology combines the information to be embedded with a random code pattern, and this combined signature is then added to the digitized image (or other creative property) as a very low signal level to produce an invisibly signed image, undetectable to the human eye and ear. The Digimarc press release discloses that, since the signature is melded with the image itself, it survives conversions from digital to analog and back. An encoded signature can be found by a computer analysis using the creator s unique code pattern. The Digimarc press release further discloses that, without this code, the signatures are impossible to detect or remove. The signatures are holographic, meaning that the entire signature is contained in a small section of an image, or in a tiny clip of music. The signatures are robust, so they can survive multiple generations of copying, transforming, printing, scanning, or compression. The Digimarc press release further discloses that Digimarc signatures can identify ownership and other information about an image or other intellectual property without completely locking out access (such as encryption does), being separated from the image (as file headers can be) or damaging the image (as watermarking, thumbnails, or reduced resolution versions do).

Document marking can also be achieved by altering the text formatting in a document, or by altering certain characteristics of textual elements (e.g., characters), in a manner that is both reliably able to be decoded even in the presence of noise and that is largely indiscernible to a reader. Brassil et al., in "Electronic Marking and Identification Techniques to Discourage Document Copying" in *IEEE Journal on Selected Areas in Communications*, Vol. 12, No. 8, October 1995, pp. 1495-1504, disclose three techniques for embedding a unique codeword in a document that enables identification of the sanctioned recipient of the document while being largely indiscernible to document readers, for the purpose of discouraging unauthorized document distribution. The image coding schemes were designed to be attack-resistant by ensuring that substantial effort would be required to remove the document encoding, and that successful removal of the encoding would result in a substantial loss of document presentation quality. The techniques disclosed include line shift coding, word shift- coding and feature coding. Use of these techniques in the resulting image is typically not noticeable to a viewer of the image, and text in the image is not substantively altered. With respect to line shift coding, Brassil et al. disclose that each intended document recipient is preassigned a unique codeword that specifies a set of text lines to be moved in the document specifically for that recipient. The codeword is decoded by performing image analysis on a copy of the document to detect the moved lines and reconstruct the codeword to identify the authorized recipient.

Many document image management operations of the kind just described make use of encoded information to perform their tasks. Some of these techniques may be deficient for certain types of applications. The techniques that rely on encoding the information such that it is incorporated somewhere in the full-size version of the document image may substantially alter the presentation of the document or cause the document to be aesthetically unappealing. Explicit bar code encoding of information draws attention to the fact that encoded information is carried on the document and may also be aesthetically inappropriate. The technique of line shift coding disclosed by Brassil claims to be indiscernible but it would appear that the amount of information that may be encoded is minimal and may be insufficient for other types of tasks.

SUMMARY OF THE INVENTION

The present invention is premised on the observation that, for many applications, techniques for embedding information unobtrusively in an image can be combined with the use of an iconic image representation in order take advantage of the benefits of encoding useful information in an indiscernible manner while retaining the ability to exploit human pattern matching capabilities for certain types of document image management applications where such capabilities provide leveraged functionality. In addition, the iconic image serves as a useful mechanism for inconspicuously embedding digital information in images in any document image management task where the presence of an iconic image is provided as a surrogate for a full-sized version of an image, regardless of whether the iconic image is specifically used for the purpose of providing clues for recognizing the full-sized image.

The iconic image includes embedded encoded data in a position where the reduced version of text in the original text image would appear, and are rendered as a series of rectangular blocks. At the reduced size, these rectangular blocks appear as straight lines and have the appearance of "greeked" text, a technique that is used to replace the rendering of actual text when rendering actual text reduces performance or efficiency of an operation. Thus, a viewer of the iconic image who is unable to see a reduced version of the text is not likely to interpret the "greeked" text as a signal of the presence of embedded data, but is more likely to interpret it as a normal consequence of the image reduction operation.

The encoding operation may implement any suitable encoding scheme that produces rectangular blocks that have a foreground color and that have size dimensions proportional to the iconic image so that when placed in the iconic image, the rectangular blocks appear to a viewer to be representative of a text portion of the original image. A significant advantage of the encoding operation that creates the iconic image is that the message carried by the binary data and the resulting rectangular blocks may be any information suitable for a particular document image management task, and need not be restricted to a reproduction of, or information about, the text in the original image that the encoded data replaces. The encoded binary data may be referred to as "arbitrary" binary data, in the sense that the message of the encoded data need bear no relationship to any text included in the full size image nor to any information about the full size image. When the iconic image is used in a document image management task, the encoded binary data provides input information required to perform the task.

The encoding operation is designed to be robust for decoding purposes to permit reliable and accurate recovery of the encoded information regardless of the resolution at which a copy of the iconic image is subsequently rendered. The use of rectangular blocks that approximate the size of words in text to contain the encoded data provides a significant advantage in robustness and reliability of decoding: rectangular blocks are relatively straightforward to detect reliably in image segmentation operations, and are likely to suffer less from the problem of touching components than would the use of character-by-character encoding. Rectangular blocks are also robust for applications in which the iconic image is printed or scanned using low resolution devices that may introduce noise or distortion into the image data representing the iconic image.

The iconic image may be rendered and printed in a suitable place (e.g., the margin or other background region) in the original text image; a text image annotated with an iconic image of the type produced by the invention will then always carry the embedded data in subsequent copies made from the annotated original. The iconic image alone may also be used in printed form or as part of a graphical user interface as a surrogate for the original text image in a variety of applications.

In particular, the iconic image may be used in a variety of document image management applications to direct or control an operation to be performed on or with the original text image represented by the iconic image. The information needed to perform the document management task is embedded in the iconic image, and a decoding operation produces the binary data required by the document image management operation to perform the document task. As will be seen in the illustrated examples below, the variety of document image tasks that may make use of the iconic image with the embedded, encoded binary data is limited only by imagination. For example, an operation may make use of the iconic image as a surrogate for the original text image because of the visual similarity between the iconic image and the original text image; this takes advantage of perceptual clues about the original text image in order to retrieve and process a specific original text image in some way specified by the operation using retrieval and processing information embedded in the iconic image. Or the iconic image may be used as a type of "document token", containing embedded and encoded information related to certain document image management operations that may be performed on one or more documents in a class or genre of documents that have certain features in common, such as their content or visual appearance.

An important advantage of the present invention is the ability to use the iconic image to bridge the digital and paper worlds while the encoded data is robustly preserved; the iconic image serves as an inconspicuous storage mechanism for the encoded data during the transitions between the two worlds.

Therefore, in accordance with one aspect of the present invention, a method is provided for operating a processor-controlled machine to perform a document image management operation using an iconic version of a text image. The machine includes an image signal source for receiving image data; memory for storing data; and a processor connected for accessing instruction data stored in the memory for operating the machine; the processor is further connected for receiving image data from the image signal source; and connected for storing data in the memory. The method comprises receiving image definition data defining an input iconic image from the image signal source. The input iconic image has an appearance to a human viewer of a reduced-size version of an original text image, and includes at least one image region including image definition data defining a plurality of rectangular blocks each having a foreground color and arranged in horizontal lines separated vertically by image regions of a background color.

Arranged in this manner, the rectangular blocks have the appearance of representing text in the original text image. The image definition data defining each rectangular block, referred to as an encoded data block, has a characteristic property that represents a portion of the binary data. The processor performs a decoding operation using the image definition data defining the plurality of rectangular blocks to produce the binary data encoded therein. The method then includes performing a document image management operation using the binary data produced by the decoding operation.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps. The description of the invention includes certain terminology that is specifically defined for describing the embodiment of the claimed invention illustrated in the accompanying drawings. These defined terms have the meanings indicated throughout this specification and in the claims, rather than any meanings that may occur in other sources, such as, for example, documents, if any, that are incorporated by reference herein elsewhere in this description.

DETAILED DESCRIPTION OF THE INVENTION

A. General Operation of the Invention

Figure 1:
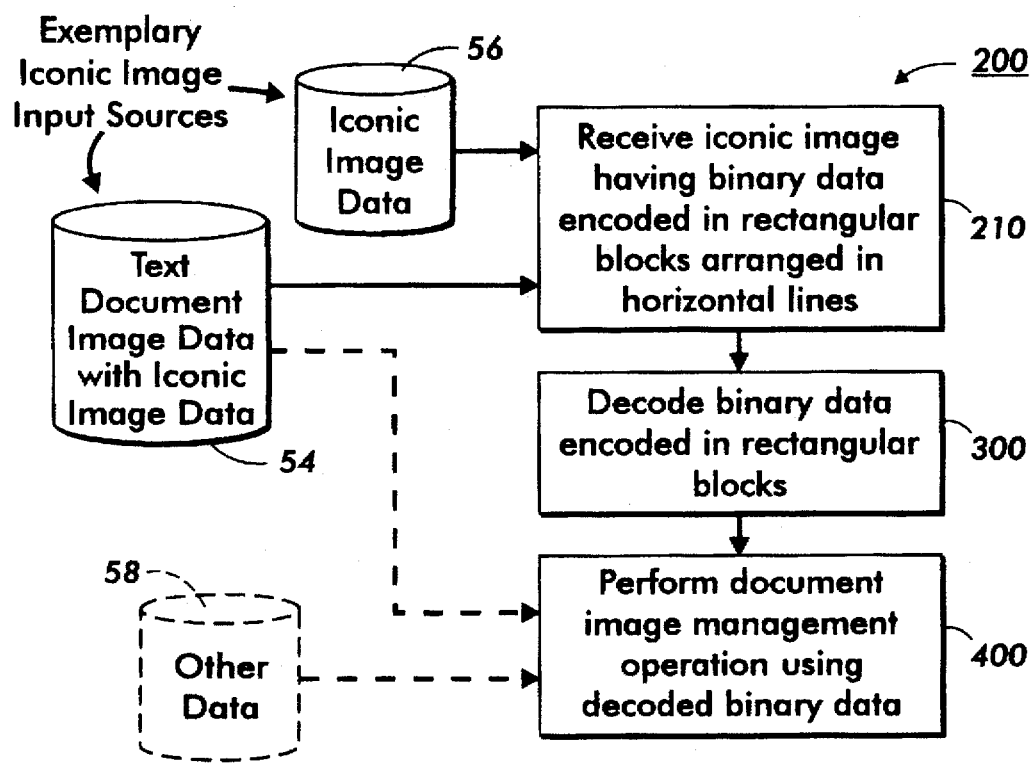
FIG. 1 is a flowchart illustrating the general operation of the invention for performing a document image management task using decoded binary data in an iconic image version of a text image according to the invention.

FIG. 1 is a flowchart illustrating document image management operation 200 of the present invention which uses an iconic version of a text image having binary data encoded therein. The input data needed to carry out operation 200 is received in box 210 and includes image definition data defining an input iconic image having at least one image region composed of image definition data defining images of rectangular blocks arranged in horizontal lines. Exemplary iconic image input sources 54 and 56 are shown in FIG. 1, and are described in more detail below, in the discussion accompanying FIGS. 4, 5 and 6. The binary data is decoded from the rectangular blocks, in box 300, and the decoded data is then used to perform a document image management operation, in box 400. The term "document image management operation" refers to any processor-controlled operation that uses or produces a text image, including, but not limited to, searching for, retrieving, and displaying a text image, where displaying includes presenting the image using any type of marking device; performing character recognition on a text image to produce a transcription of the text in the image; performing a copying, distribution or transmission operation using the text image; and performing an authentication operation to authenticate the text image as to its content and/or sender. Any one of these document image management operations may require additional input data, which is shown as an optional input source in FIG. 1 as data file or data structure 58 illustrated as having a dashed line outline. Similarly, the optional data needed by document image management operation 400 may also include the text document image portion of iconic image source data 54.

Figure 2:
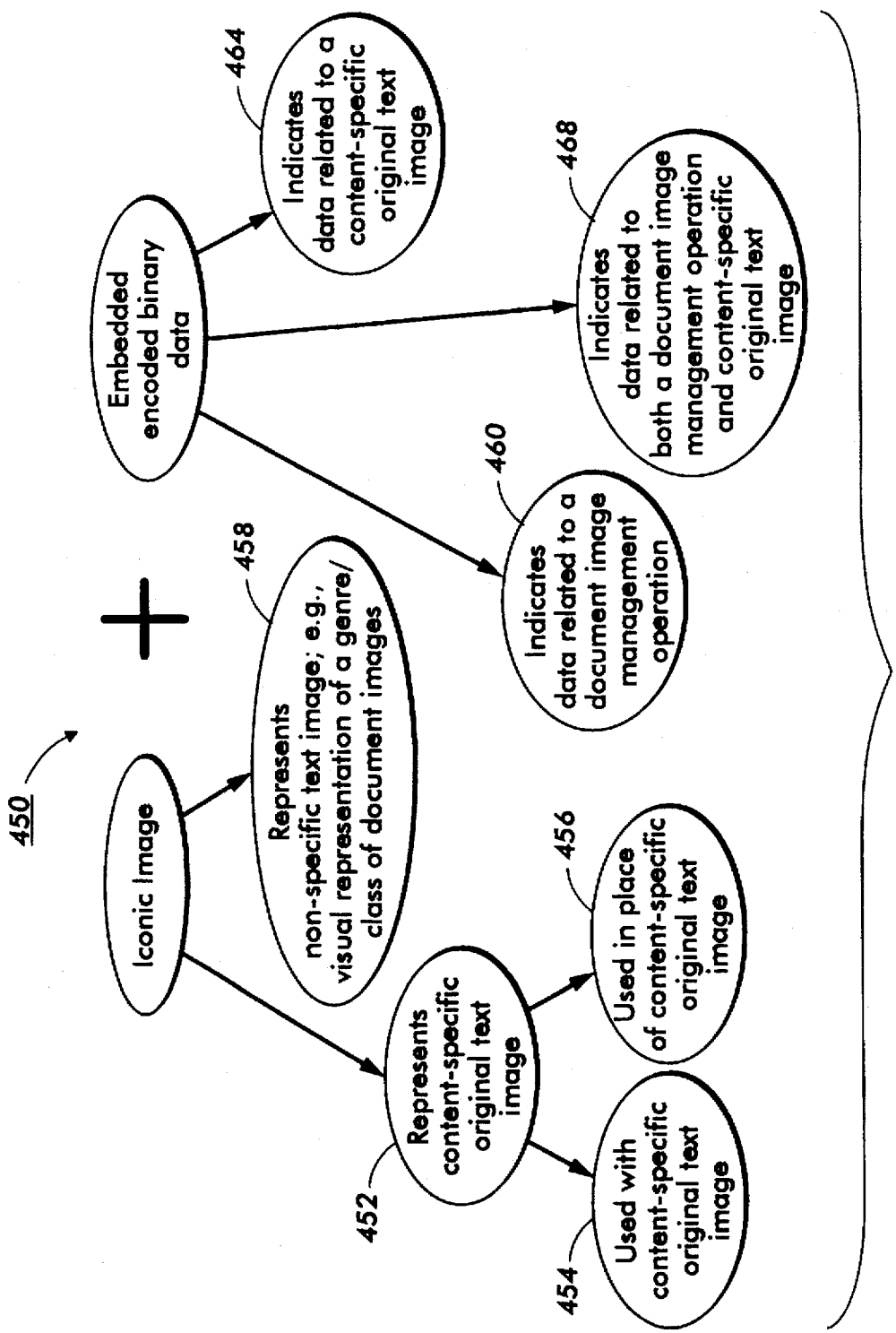
FIG. 2 illustrates a chart showing possible configurations of various uses of an iconic image combined with various types of data that may be encoded in the image, for carrying out a document image management task according to the present invention.

The input iconic image in combination with the encoded binary data may each be flexibly specified so as to be capable of being used in a wide variety of document image management operations. FIG. 2 illustrates chart 450 which shows a taxonomy of the various combinations of iconic image specification and type of information indicated by the encoded binary data. These combinations will be discussed with more specificity as the general operations of the present invention and the data they operate on or produce are described in more detail below.

1. Input Iconic Image Having Encoded Binary Data.

a. The iconic image as a reduced-size version of an original text image.

As previously noted, an iconic image is a reduced sized version, or representation, of an original text image that substantially preserves visually significant page layout features of the full size version of the original image. The term "original text image" will be used to refer to the image definition data that defines the full-size version of the text image that is represented by a particular iconic image. An original text image includes at least one image region composed of image definition data defining images of characters, generally collectively referred to as text; As used herein, a "character" is a single, discrete, abstract element or symbol and includes not only alphabetic and numerical elements, but also punctuation marks, diacritical marks, mathematical and logical symbols used in mathematical notation such as equations, and phonetic, ideographic, or pictographic elements. For example, symbols in pictographic languages and symbols representing musical notation are included in the term character. A sequence of characters forms a "text" or "string". Image definition data defines a text image when a plurality of character images occur in the space defined by the image. Text images of the type suitable as being represented by iconic images according to the present invention are assumed to be rectangular, and to have an image coordinate system in which x increases in a horizontal direction to the right, y increases in a vertical direction downward, and x=y=0 is at the upper left corner of the image. An image location is given by a set of image coordinates, (x, y). Each location in an image may be called a "pixel." In an array defining an image in which each item of data provides a value, each value indicating the color of a location may be called a "pixel value". Each pixel value is a bit in the "binary form" of the image, a grayscale value in a "grayscale form" of the image, or a set of color space coordinates in a "color coordinate form" of the image, the binary form, grayscale form, and color coordinate form each being a two-dimensional array defining the image.

Figure 3:
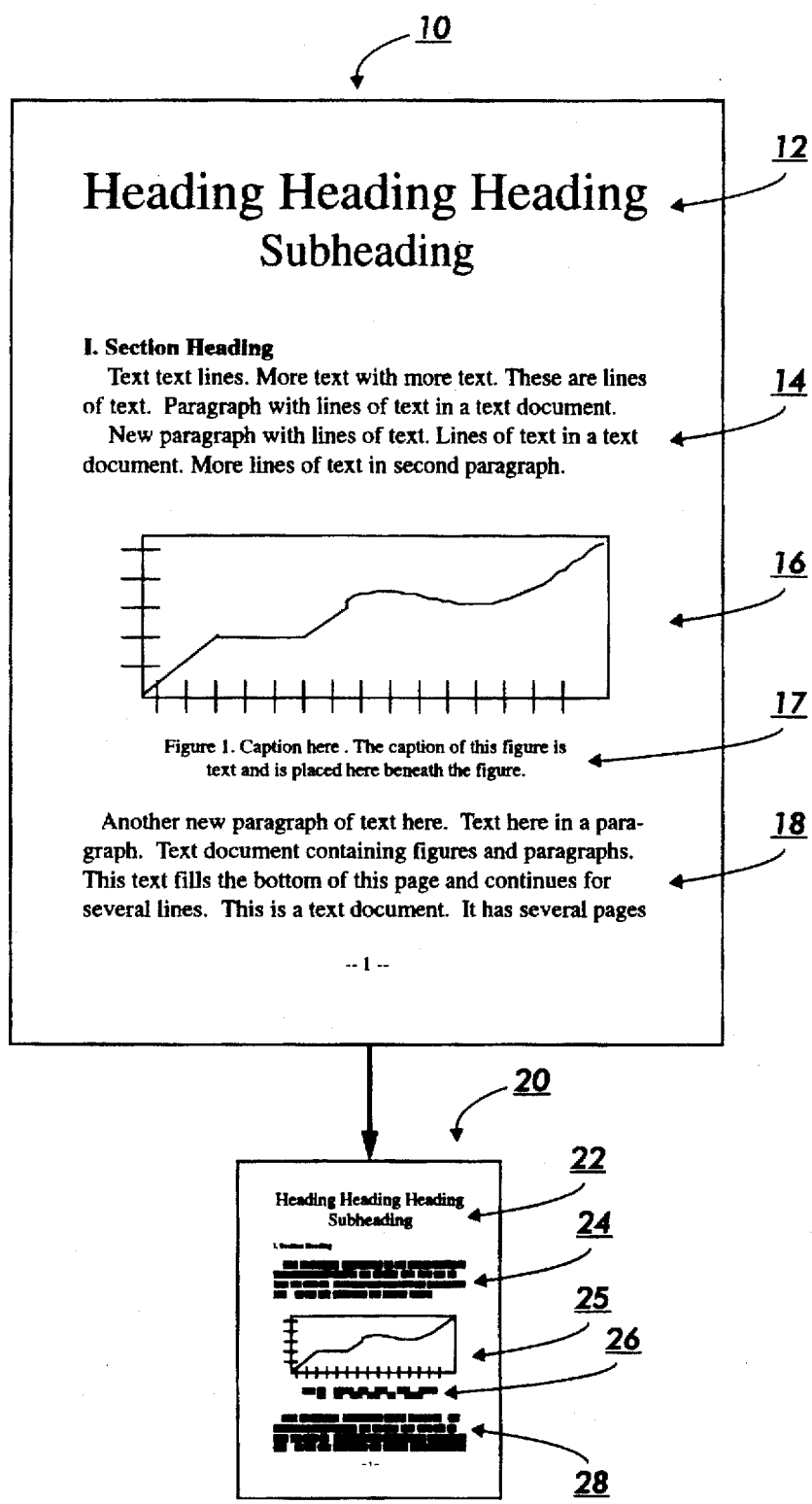
FIG. 3 illustrates an original text image and its iconic image version which is a suitable input image to the present invention.

FIG. 3 shows original text image 10 that includes an image region 12 that includes textual headings, image regions 14 and 18 that include paragraphs of text, an image region 16 that includes a graphical object and image region 17 indicating another text area that can be seen to indicate a caption for the figure that is the graphical object in image region 16. It can be seen that original text image 10 has a characteristic page layout appearance that includes specific margin dimensions, specific placement of a footer with a page number, distinctive spacing between paragraphs and of lines within paragraphs, the absence of text justification at the right margin, and text that appears in various font sizes, which together contribute to producing a distinctive overall visual appearance.

Figure 16:
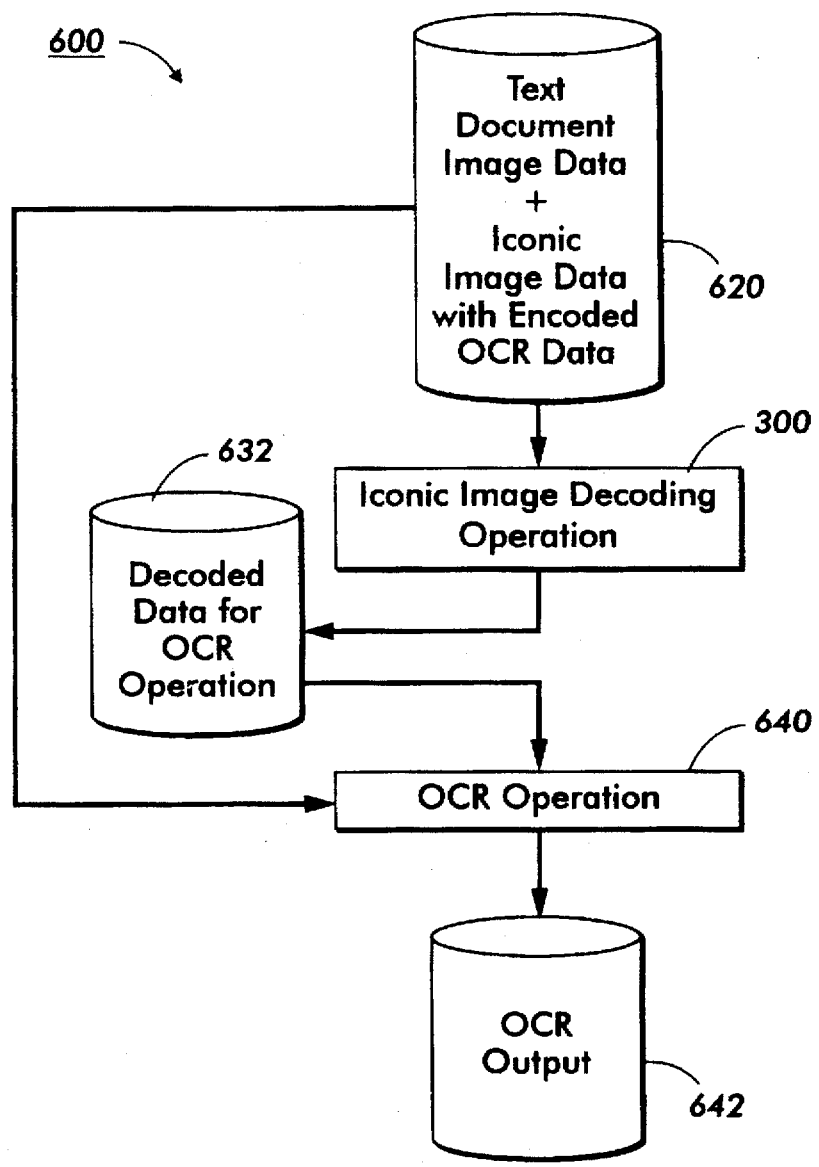
FIG. 16 is a flowchart illustrating an embodiment of the present invention for performing a character recognition operation to produce a transcript of a text image using data encoded in an iconic image version of the text image according to the operation shown in FIG. 15, and decoded according to the present invention.

FIG. 3 also shows iconic image 20, a reduced size version of original text image 10, that is input to the technique of the present invention. It can be seen that iconic image 20 has preserved the distinctive overall visual appearance of original text image 10, such that heading 12 in original image 10 is visible in a reduced size as heading 22 in iconic image 20, a reduced-size version 25 of FIG. 16 is positioned in proportionally the same position in iconic image 20 as it is in original image 10, and text regions 14 and 18 in original image 10 are represented in iconic image 20 as regions 24 and 28, respectively, of horizontal lines of rectangular blocks.

With reference to the taxonomy in FIG. 2, iconic image 20 may either represent a content-specific original text image 452, or it may represent a non-specific text image 458. A content-specific text image refers to a particular document image that is identifiable on the basis of its contents, such as, for example, "Bob's July XYZ project report" or "Ann's 1995 journal article on Topic ABC"; typically the iconic image of a content-specific original text image will have preserve the distinct visual appearance of original image. In contrast, a non-specific text image refers to a genre or class of document images, such as, for example, the class of document images that are "project reports" or "project reports on XYZ project", or the class of document images that are "journal articles" or the class of document images that are "journal articles on Topic ABC". A content-specific iconic image maps to a single document, while a non-content specific document may map to one or more documents.

With further reference to the taxonomy of FIG. 2, when iconic image 20 represents a content-specific original text image 452, iconic image 20 may be used in a document image management operation in conjunction with the original text image it represents, as indicated by entry 454 in chart 450, or it may be used in the absence of, or in place of, the content-specific original text image, as indicated by entry 456. In this latter use, an iconic image may be referred to as a "document surrogate."

Figure 4:
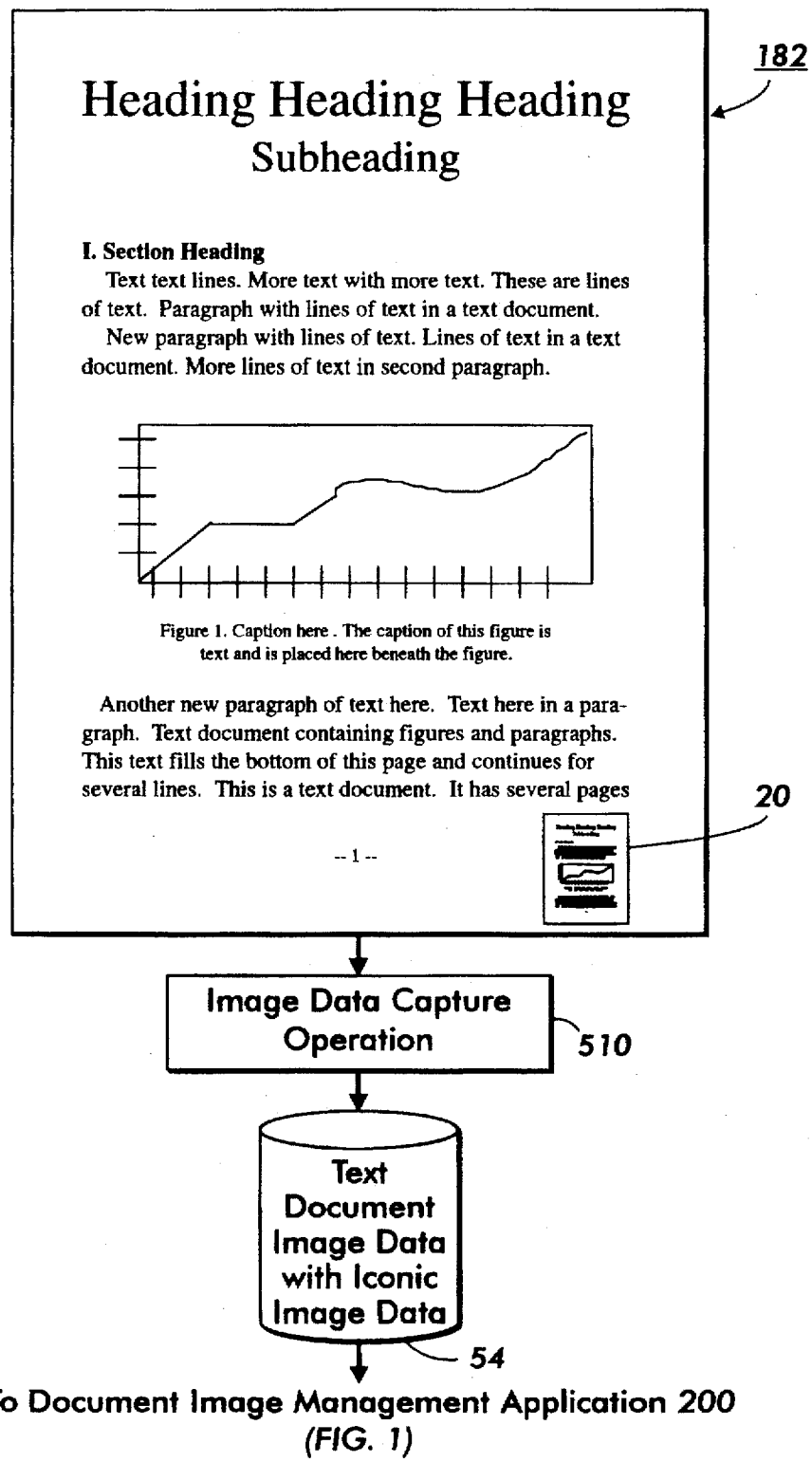
FIG. 4 illustrates a representative text image with the iconic version of the text image rendered as part of the image, and an image data capture operation for providing a first exemplary form of image data including iconic image data as input suitable to the present invention.

FIG. 4 illustrates an example of iconic image category 454 in FIG. 2: printed fullsize text image 182 in conjunction with iconic image 20, representing text image 182, printed in the lower margin of the document. Once printed, subsequent copies of the hardcopy printed document will carry iconic image 20 and its embedded, encoded data, which may be accessed via the present invention to provide information for use in performing a document image management operation.

b. Sources of iconic image input data.

Figure 5:
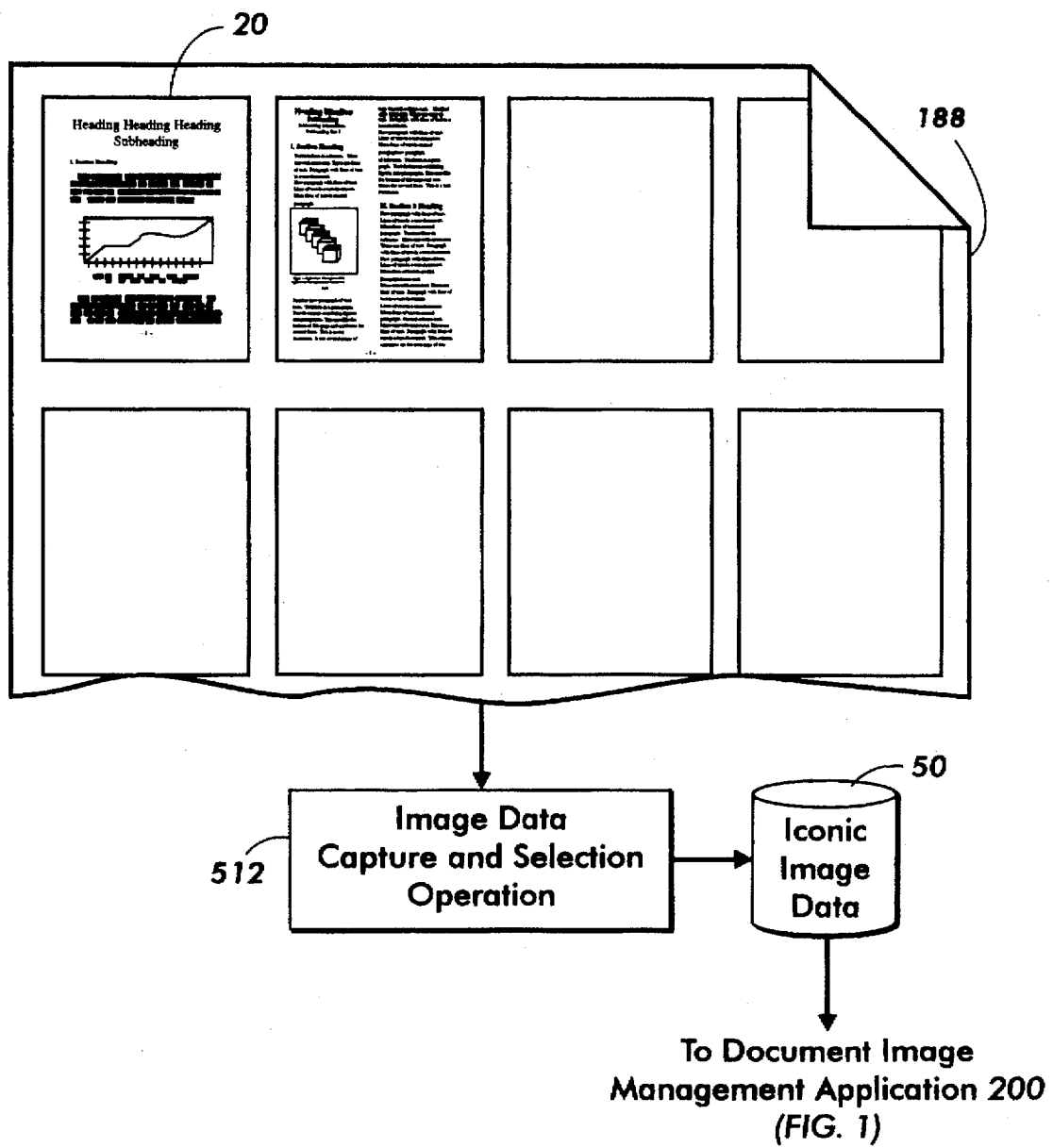
FIG. 5 illustrates a representative hardcopy text document showing several iconic images, and an image data capture and selection operation for providing a second exemplary form of image data including iconic image data as input suitable to the present invention.
Figure 6:
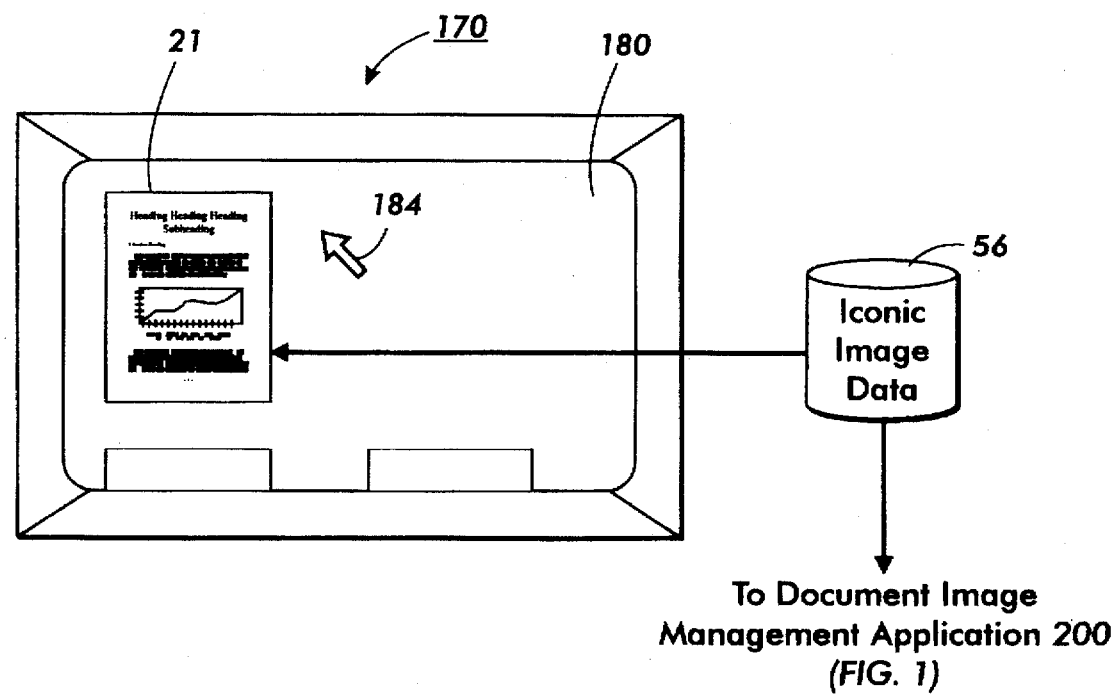
FIG. 6 illustrates the display area of a display device showing examples of iconic versions of text images, and a third exemplary form of iconic image data as input suitable to the present invention.

FIGS. 4, 5 and 6 illustrate several alternative input data sources for providing the iconic image data to document image management operation 400 of FIG. 1. FIG. 4 illustrates the situation when iconic image 20 is printed as part of a printed, hardcopy version 182 of an original image 10 (FIG. 3) which is intended to be input to operation 400 of FIG. 1. Document 182 is provided to image data capture operation 510 which produces a file or data structure 54 of the text document image data that includes iconic image data, which is then provided as input data to operation 400. A suitable image data capture operation is a scanning operation or the like.

FIG. 5 illustrates a hardcopy document page 188 with a collection of iconic images rendered on the page. Iconic images 20 and 186 in particular are shown in detail. When these iconic images are used to represent full size versions of original text documents, this single hardcopy document can serve as a type of physical storage device for the encoded information about the particular documents represented; each iconic image shown on document page 188 is a document surrogate for the full-size text document (of one or more pages) that it represents, and is an example of category 456 in the taxonomy of FIG. 2. The operations of scanning document 188 and decoding the embedded data in a respective one of the iconic images selected according to a selection operation provide iconic image data 50 for input to operation 400 of FIG. 1. Iconic image data 50 includes the encoded data about the document the iconic image represents to a processor-controlled machine for further use. Alternatively, each iconic image rendered on document page 188 may be representative of a genre or class of documents, or to a database of documents, and a respective one of the iconic images on document page 188 may be used to provide access to the class of documents by means of the encoded data embedded therein; in this latter case, these iconic images are examples of category 458 in the taxonomy of FIG. 2.

FIG. 6 illustrates the display version 21 of an iconic image, rendered from iconic image data 56 and displayed in display area 180 of device 170. Iconic image 21 may be one of many displayed iconic images (not shown) in display area 180, and may be an iconic image of either category 458 or 456 of FIG. 2. A displayed iconic image is available for direct manipulation by a user who is able to manipulate cursor 184 to select or otherwise interact with any one of the displayed iconic images using a direct manipulation device such as a mouse. Keyboard and stylus devices are also suitable direct interaction devices. In response to a user's interaction with displayed iconic image 21 to carry out a request to perform a function, iconic image data 56 is provided to operation 200 of FIG. 1, and a decoding operation such as the one described below in the discussion accompanying FIG. 11 can extract and decode the embedded data, which may provide information with which to carry out the user's request.

The iconic image data received in box 210 of the flowchart of FIG. 1 that illustrates the general operation of the present invention may be derived from any one of the sources of document image 182 of FIG. 4, document image 188 of FIG. 5, or display area 180 in FIG. 6.

Figure 7:
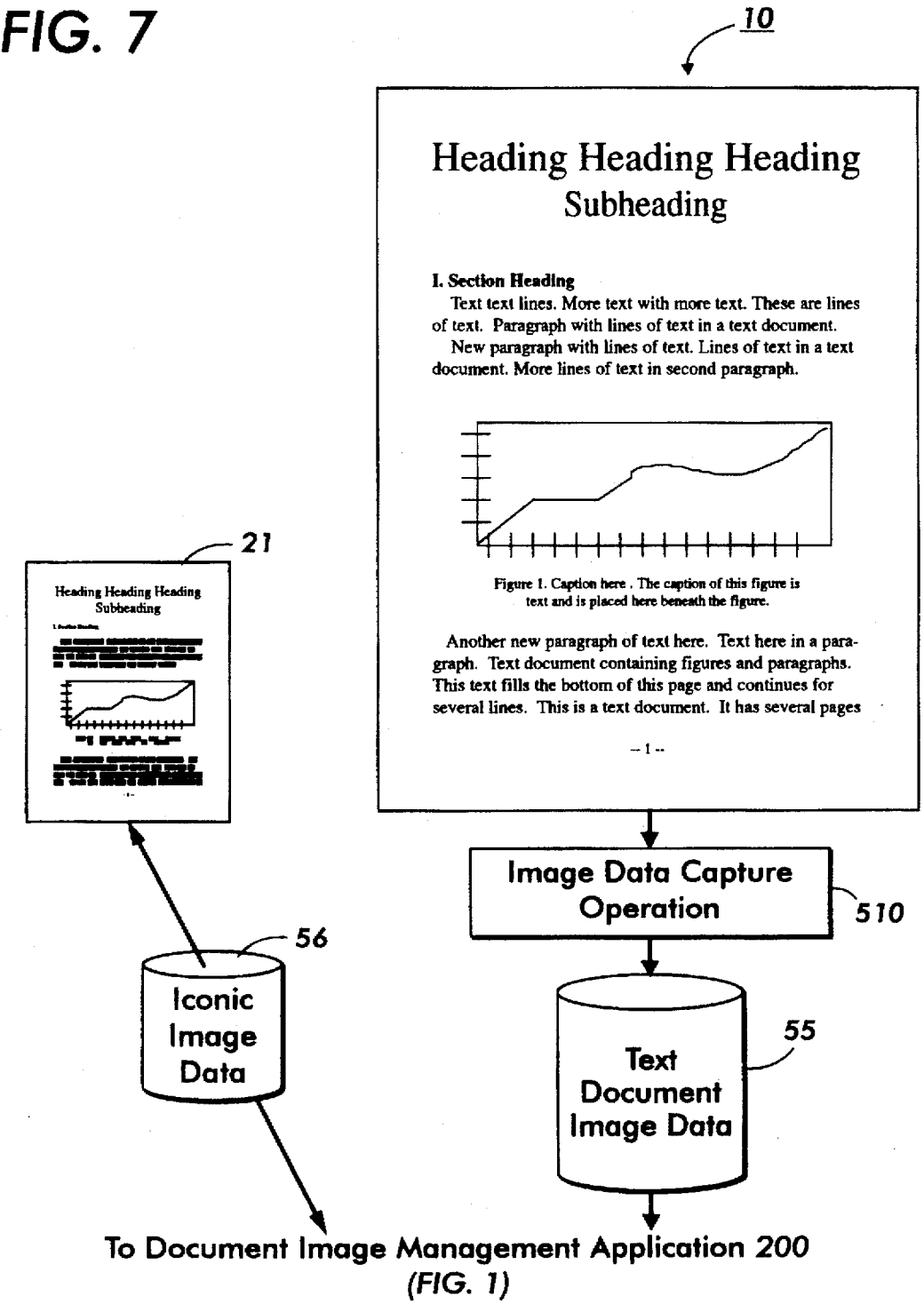
FIG. 7 illustrates providing iconic image data and text document image data as inputs derived from separate sources and provided to a document image management operation according to the present invention.

When a particular document image management operation 200 requires both text document image data and iconic image data, these may be provided from separate sources. Thus, iconic image data may be provided as input from either a version of the iconic image produced by an image capture operation, as shown in FIG. 5, or from a displayed version, as shown in FIG. 6, and the text document image data may be provided from a separate image data capture source. FIG. 7 illustrates an example of dual-source input, where the iconic image data is provided separately from the image data of the fullsize original text image that the iconic image represents.

3. The Encoded Binary Data.

a. What information may be encoded.

Figures 8, 9:
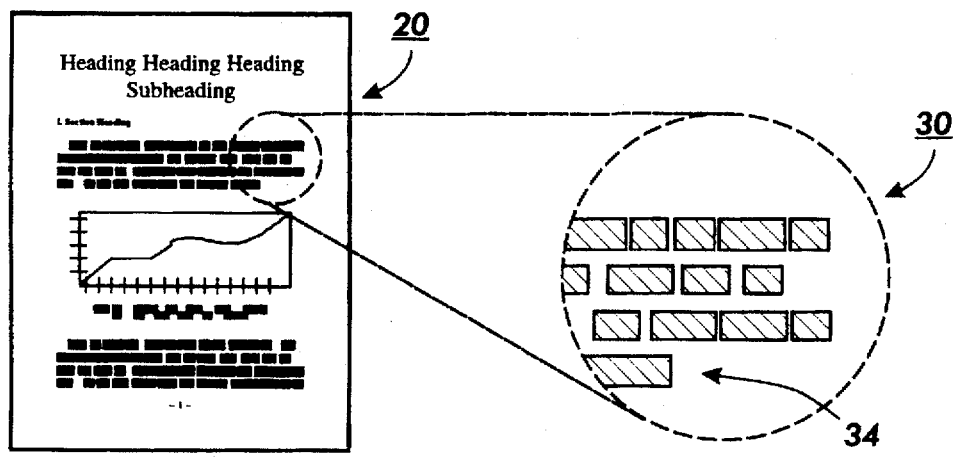
FIG. 8 illustrates an example of binary data that has been encoded in an iconic image and that may be decoded according to the present invention.
FIG. 9 illustrates an enlarged portion of the iconic image showing encoded binary data in the form of rectangular data blocks.

FIG. 8 illustrates a representative sample of binary data 70 that may be encoded in an iconic image that is input to the present invention. Binary data 70 is not restricted in any way as to the nature of the information it may convey, and may, for example, represent character symbols in a language using ASCII or UNICODE character encoding, or the compressed or encrypted form of such symbols. Binary data 70 may also indicate instruction data of the type used to operate a processor that controls a machine having the configuration of machine 100 in FIG. 20. Examples of such machines include a computer, printer, scanning device or facsimile device, or a machine that combines these functions. Examples provided below of the type of information that may be represented by binary data 70 are not intended to be exhaustive or limiting in any manner.

The information represented by binary data 70 may be generally classified as shown in chart 450 of FIG. 2; that is, the encoded binary data may indicate information related to a content-specific original text image, noted by reference numeral 464, or it may indicate data related to a document management operation, denoted as reference numeral 460, or it may be a combination of those two classes of data, denoted as reference numeral 468. Data related to a document management operation may be generally characterized as operation parameter data that the operation uses to carry out its functions.

The information represented by binary data 70 may be directly related to the content of the full-size text image represented by the iconic image in which it is encoded; binary data 70 may represent, for example, all or part of the actual text included in the represented full-size text image obtained by performing a character recognition operation on the full-size text image, or obtained from some other source, such as the word processing data structure which was used to produce the full-size text image.

Alternatively or in addition to the content-related information, binary data 70 may represent certain information about the represented full-size text image, such as identifying information. Information about the document may be generally referred to as "meta-data." For example, binary data 70 may represent character encoded information indicating the URL (Uniform Resources Locator) of a location on the World Wide Web, where a representation of the full-size text image may be found. Such a representation may include: the image definition data structure of the text image itself; a file containing the formatted data for display of the text image on a computer using a browser program; a file from which the full-size text image was produced; a file containing a simple ASCII representation of the document from which the full-size text image was produced; or a file containing a simple, formatted ASCII version of the full-size text image. In another example, binary data 70 may indicate attribute information about the full-size text image, such as a time stamp indicating the version date and time of a word processing file from which the full-size text image was produced, or the date and time the iconic image was produced or printed, or any other date or time information that was made available during the process of producing the iconic image. Additional examples of attribute information include input text image owner identification information; a digital signature verifying the authenticity of the iconic image or of the data from which the iconic image was derived; and identification information about the printer on which the iconic image containing the encoded binary data was printed.

Binary data 70 may also include information generated by the encoding operation that encodes the binary data into the iconic image, or by an image reduction operation or by some other operation that provides assistance to decoding operation 300. Such information might include cyclic redundancy code (CRC) data, error correction code (ECC) data, or information about the data being encoded, such as, for example, the number of lines of encoded data, the number of bytes of encoded data, or the number of encoded data blocks that are included in the iconic image.

Binary data 70 may also indicate specific information related to a function or application with which the iconic image is associated or used. For example, the iconic image may contain color information specifying colors for regions or portions of the full size image when the full size image is printed. A color digital copier (or a binary scanner and color printer) equipped with the ability to decode the iconic image would then be able to re-render a black and white version of the full size image in color.

In a further example, the iconic image may be used as part of a system that controls authorized distribution or use of the full sized text image, or of the electronic document form of the image, represented by the iconic image. An iconic image may contain encoded data indicating the functions that the possessor or viewer of the iconic image is authorized to perform with the full sized image. In another example, the iconic image may serve as part of a document indexing or browsing function or application. An iconic image of a table of contents or of a bibliography could provide identifying reference information, such as a hypertext reference, that would provide automatic access to a specific portion of a document or to a document referenced in the contents or bibliography.

b. Overview of encoding data into rectangular blocks.

Figure 10:
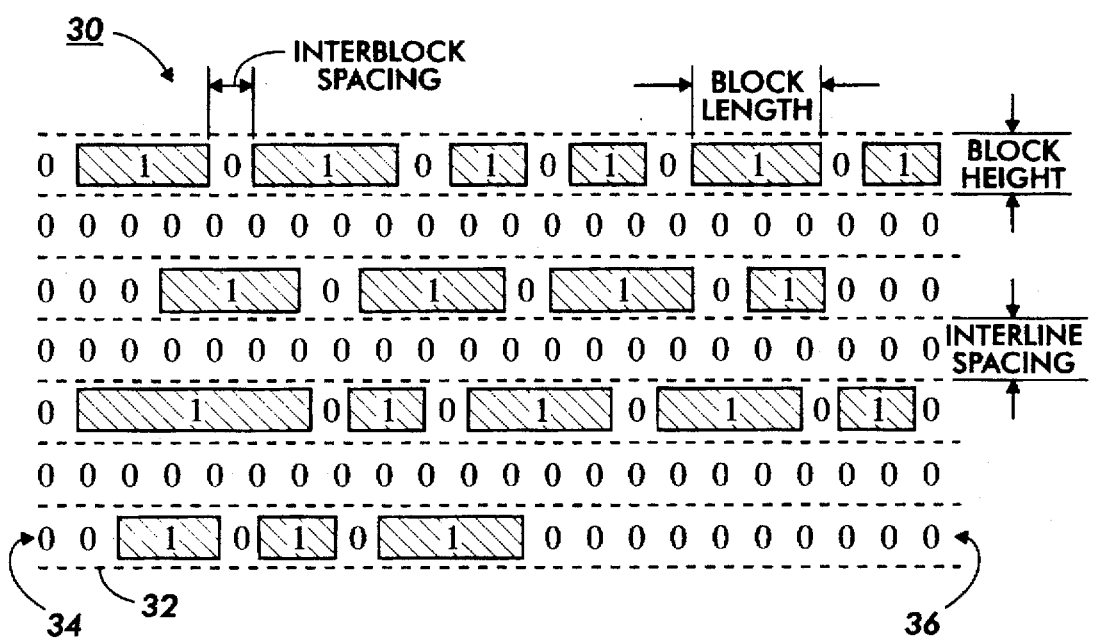
FIG. 10 schematically illustrates several characteristics and properties of the encoded data blocks shown enlarged in FIG. 9.

FIGS. 9 and 10 illustrate some general principles about the appearance of the encoded data in an iconic image. An encoding operation maps binary data of the type represented by binary data 70 in FIG. 8 to rectangular blocks, referred to as encoded data blocks, having certain appearance characteristics, properties and features, generally called "display features," which may vary according to the application in which the iconic image is being used. The term "display feature" refers to any human perception produced by a display device, and includes a single display feature and also may include plural display features that together form a pattern of display features in an image. Thus, interblock spacing, block height, block length and interline spacing are all perceptible display features of the encoded data blocks, and the image definition data defining each rectangular block has a characteristic property that represents a portion of the binary data. FIG. 9 shows iconic image 20 with portion 30 enlarged; portion 30 includes horizontally positioned, linear sequences of rectangular blocks. In general, binary data of the type shown by example in FIG. 8 and encoded in portion 30 of iconic image 20 is encoded into rectangular blocks having a foreground color; depending on the particular application for which the iconic image is to be used, the foreground color may be, but need not be, compatible with the foreground color of the text in the original text region that the rectangular blocks replace. FIG. 10 shows a more detailed view of portion 30. For each simulated line of text in the iconic image, a sequence of encoded data blocks containing encoded data are placed horizontally in the iconic image along a baseline such as baseline 32 and are horizontally spaced along the baseline by regions of background color, labeled in FIG. 10 as interblock spacing. In FIG. 10, the foreground color is represented as having a pixel value of "1" and the background color has a pixel value of "0", as is conventionally the case for representing black and white images. When an application's requirements demand that the encoded data blocks simulate text as closely as possible, interblock spacing should be roughly the same distance, or give the appearance of being roughly the same when the iconic image is printed or displayed, and the interline spacing should be proportional to the interline spacing in the original image. How faithfully the original text being replaced by the encoded data blocks needs to be simulated is a function of the needs of the application using the iconic image, and the blocks need not replace words and lines on a one-for-one basis. The height of each rectangular block, labeled as block height in FIG. 10, is generally proportional to other page layout dimensions in the iconic image, or to the height of the text in input text image 10; the block height may be uniform, as shown in FIG. 10, but need not be, if a suitable encoding operation is found that encodes data using the height dimension of the block.

FIG. 10 shows the encoded data blocks as having varying block lengths. Generally, the length of the blocks should be somewhat random or at least vary in a pattern that gives the appearance of the actual text in the original text image represented by the iconic image. The characteristics of the word lengths in the language represented in the original text image may influence the selection of an encoding scheme, and an encoding scheme that produces an aesthetically pleasing pattern of encoded data blocks for replacing text in one language may not be particularly suited to representing text in a different language with markedly different word length characteristics.

A second stream of data may be encoded in the background color regions that serve as interblock spacing between the encoded data blocks by using different length background color regions. In the simplest encoding, one bit is encoded using short and long background color regions to separate encoded data blocks. The encoded bit can be used as "parity" for error detection on the previous encoded data block. A set of such bits can also be used for error detection or correction on the message that is encoded in the encoded data blocks.

In some encoding operations, the lines of encoded data blocks may need to be positioned so as to begin and end consistently at the same respective locations on a horizontal line; consistent line beginning positions, at the left margin, are generally expected in text documents, and are straightforward to implement. Consistent line ending positions for the encoded data blocks may be preferred when the text being replaced in an original text image is justified at the right margin. In addition, regardless of whether the text lines being replaced are justified at the right margin, simulating the last lines of paragraphs accurately may be important in some applications, such as, for example, when the iconic image is to be used as a surrogate for the original image and the display features of paragraph formatting are clues to the identity of the document represented. For example, it can be seen from FIG. 9 that the encoded data blocks of line 34 end before reaching the full length of line 34, approximately where the last line ends in the paragraph of text in original text image 10 in FIG. 3; in FIG. 10 it can be seen that the remainder of line 34 is filled with a run 36 of background color pixels. Thus, even if there is additional data to encode, the remainder of line 34 is left empty to simulate the abbreviated length of the last line of a paragraph.

To simulate both left and right text justification, each row (simulating a text line) of horizontally positioned encoded data blocks must have the same length. This is accomplished by using the regions of background color, referred to as interblock spacing in FIG. 10, that separate each encoded data block from the previous and succeeding blocks to adjust the positioning of the encoded data blocks placed on the line. The general procedure is as follows: position as many encoded data blocks in the sequence of blocks to be positioned as will fit on the line without exceeding the maximum line length, using a minimum allowed value of interblock spacing between each block; then increase the amount of interblock spacing between each block until the required line length is obtained.

An alternative procedure for producing equal length rows of blocks is to add an encoded data block to each line that has the width required to make the justification. This data block must be at a known (or computable) position in each line, so that the added block is able to be distinguished from the actual encoded data during a decoding operation. For example, the added block can always be the last block positioned in each full line of blocks. Note also that a combination of the techniques of adjusting the interblock spacing and adding a block to each line may be used to produce horizontal rows of encoded data blocks that have the same line length.

In a variation of the general principles of encoding just described, special linestart or line-end markers may be inserted at the beginning or end, respectively, of each horizontal row of encoded data blocks in order to assist in the decoding process. Such markers may be some small number of pixels in width that make them clearly distinguishable from encoded data blocks; a width of two or three pixels is adequate to mark each row and yet does not produce marks in the iconic image "paragraphs" that are easily perceptible or distracting to a viewer of the iconic image. The markers may have the same height as the block height of the encoded data blocks so as to minimize the likelihood of their being noticed in the iconic image.

Specific examples of encoding operations suitable for the present invention are discussed in the previously referenced Iconic Image Encoding application. The size of the iconic image and the regions available for encoding information necessarily limit the amount of information a single iconic image can carry, and some applications will require selection of a particularly efficient encoding scheme. General principles of information theory as applied to signal encoding can be used to evaluate the efficiency of a particular encoding scheme. In particular, evaluating run length limited (RLL) codes using known principles can aid in the selection of a reasonable RLL encoding scheme for a particular application of an iconic image in light of the type and quantity of information being encoded. In magnetic recording technology, RLL codes are characterized by the parameters [d, k] where d represents the minimum and k represents the maximum number of 0s between two consecutive 1s in a coded sequence of binary data. Since one of the goals of encoding data in the iconic image is to produce perceptible blocks in a foreground color, simply reversing the polarity of a selected RLL code produces length-limited runs of 1's each separated by a single zero, which consequently produce blocks of foreground color pixels separated by background color regions in the iconic image. Information on RLL encoding is found in numerous textbooks and articles on information theory, magnetic recording, and other related signal encoding topics. See, for example, *Magnetic Recording Volume II: Computer Data Storage*, C. D. Mee and E. D. Daniel, eds., McGraw-Hill Book Company, New York, 1988, Chapter 5. See also, Norris and Bloomberg, "Channel Capacity of Charge-Constrained Run-Length Limited Codes," *IEEE Transactions on Magnetics*, Vol. MAG-17, No. 6, November, 1981, pp. 3452–3455, (hereafter "the Norris and Bloomberg article") which is hereby incorporated by reference for all that it teaches. The efficiency of an RLL code is evaluated by a measurement called the average channel rate, which measures the number of bits of data encoded per cell.

B. Decoding an Iconic Image

Decoding the message of binary data 70 (FIG. 8) from iconic image 20 (FIG. 9) involves two broad operations: identification of the region or regions in the iconic image that contain the encoded data blocks, and decoding of the message from the blocks. These broad operations are the same regardless of whether the iconic image to be encoded is provided by an image data capture operation that converts a physical document on which the iconic image is rendered to digital data, or is provided as an original electronic image in the form in which it was encoded. However, particular details of locating the encoded data blocks may be implemented differently for iconic images in their original electronic form and that have not been previously scanned or are not provided by an image data capture operation, since image processing operations designed to account for the noise typically introduced by an image data capture operation would not necessarily be required. In addition, the electronic form of the iconic image may contain the regions of encoded data blocks as rectangles.

The following description of a decoding operation is made with reference to decoding encoded data blocks that carry the binary message in a variation of their lengths, and not in their heights or in their vertical positions with respect to a baseline, and include operations that account for noise introduced by the image capture process. A brief discussion then follows of the different considerations needed in decoding encoded data blocks that carry the binary message in a variation of height or in their vertical positions with respect to a baseline.

1. Finding Image Regions of Encoded Data Blocks.

Figure 11:
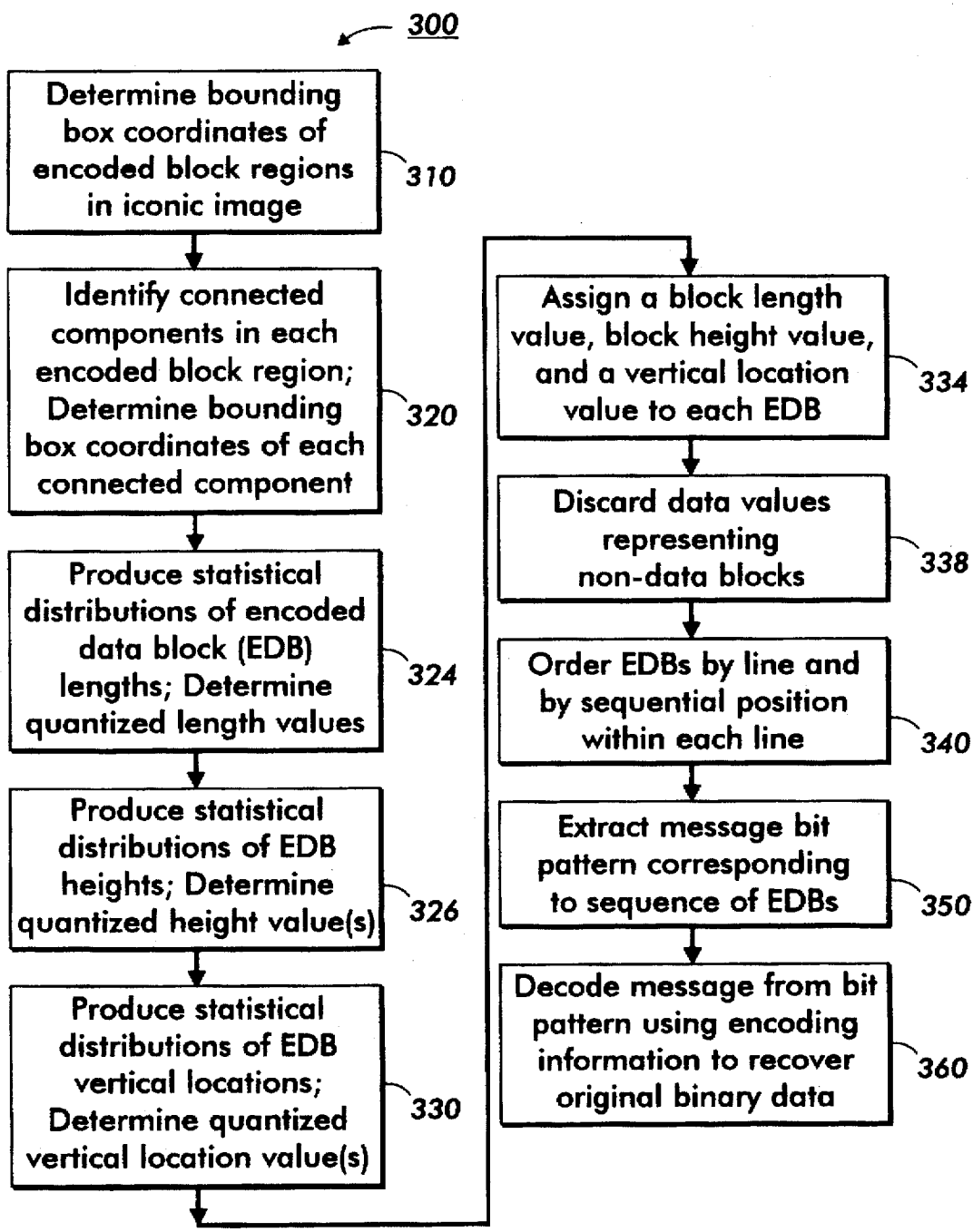
FIG. 11 is a flowchart illustrating the general operation of the decoding operation of the present invention.

FIG. 11 provides a general flowchart of the decoding operation 300 of FIG. 1. An input image to be decoded has regions of encoded data blocks located within it, but in many applications of iconic images these locations are not likely to be known in advance. A region in iconic image 20 that is composed of horizontal rows of elongated rectangular blocks, each of which has approximately the same height will be referred to hereafter as an encoded block region.

Standard image processing operations may be used, in box 310, to reliably locate the bounding box coordinates of the encoded block regions in an input image. By way of example, the following process may be used, but other image processing operations may also be suitable. This process assumes that each encoded data block—also referred to in this discussion as an EDB—has approximately the same height, and that this height is known. The beginning or ends of these lines may be composed of specific "line-start/line-end" markers that are all of an identical shape, distinguishable from the blocks. Location of the encoded block regions can be done in two steps. In the first step, image-based morphological operations can be used to locate likely candidates for these regions. In the second step, the candidates are evaluated to see if they conform to the expected shapes.

Morphological operations map a source image onto a destination image according to a rule defined by a pixel pattern called a structuring element (SE). The SE is defined by a center location and a number of pixel locations, each having a defined value (ON or OFF). Other pixel positions, referred to as "don't care," are ignored. The pixels defining the SE do not have to be adjacent to each other. The center location need not be at the geometrical center of the pattern; indeed it need not even be inside the pattern of ON and OFF pixels. By way of background, several common morphological operations operate as follows: "Erosion" is a morphological operation wherein a given pixel in the destination image is turned ON if and only if the result of superimposing the SE center on the corresponding pixel location in the source image results in a match between all ON pixels in the SE and the underlying pixels in the source image. "Dilation" is a morphological operation wherein a given pixel in the source image being ON causes the SE to be written into the destination image with the SE center at the corresponding location in the destination image. An SE used for dilation typically has no OFF pixels. "Opening" is a morphological operation that consists of an erosion followed by a dilation. The result is to replicate the ON pixels in the SE in the destination image for each match of the ON pixels in the source image. "Closing" is a morphological operation consisting of a dilation followed by an erosion. For opening and closing, the result does not depend on the center location of the SE since each operation includes successive complementary operations with the same SE. Information about morphological image processing is available in a number of texts and articles. For example, image-based approaches to document image analysis based on image shape and texture properties are described in D. S. Bloomberg, "Multiresolution morphological analysis of document images", *SPIE Conf. 1818, Visual Communications and Image Processing'92*, Boston, Mass., November 1992, pp. 648–662, which is hereby incorporated herein by reference as if set out in full.

The morphological operations used to locate encoded block regions comprise two filtering operations: first, a morphological closing with a small horizontal structuring element is used on the input image to produce a resulting image, referred to as R1; this operation will cause the EDBs to horizontally merge, forming thin horizontal lines in R1. Then, a hit-miss structuring element is used on R1 to locate these thin horizontal lines; that is, the hit-miss structuring element projects out of the R1 image where the thin horizontal lines are located. The hit-miss structuring element would typically be of a form such as element 312 shown in FIG. 12. This is a filter that is placed, in effect, at every possible location on (or over) the R1 image. At each location in the R1 image, the result is either a match with SE 312 or no match. If a match is found, an ON pixel is written at this location in a resulting R2 image; otherwise a 0 pixel is written in the R2 image. Thus the result of the operation is to produce a binary image, R2, with ON pixels wherever filter 312 matches at a location in the R1 image and OFF pixels elsewhere. The conditions for a match between filter 312 and a location on the R1 image are (1) all pixels in the R1 image "below" (or at the location of) the 1 values in filter 312 must be ON and (2) all pixels in the R1 image below the 2s in filter 312 must be OFF. The pixels below the 0s are not tested. This filter is well-suited to finding horizontal lines that are about 5 pixels wide. The horizontal extension of the filter should be long enough to eliminate accidental matches from most elements of the image that are not joined or merged EDBs.

Figure 12:
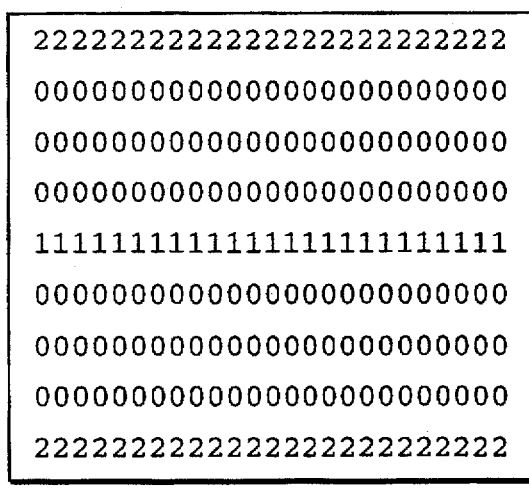
FIG. 12 illustrates a structuring element used in a morphological operation to identify encoded blocks in an iconic image, according to the decoding operation illustrated in FIG. 11.

The hit-miss operation is then followed by a dilation operation performed on resulting image R2 using the ON pixels of structuring element 312 (FIG. 12). This operation expands the horizontal lines to be approximately the same length they were in R1, the output of the closing operation. The dilation operation produces resulting image R3.

Resulting image R3 will contain a set of thin horizontal lines that potentially mark the locations of the EDBs; additionally, there may be a few other places in R3 with ON pixels. Then, a morphological closing operation is used with a small vertical structuring element, large enough to join the horizontal lines; this operation will solidify the thin horizontal lines into a block of ON pixels, while having relatively little effect on the other ON pixels which will remain scattered. The resulting image R4 produced by the morphological closing operation can then be searched for these blocks of solid ON pixels that are candidates for the encoded block regions containing the encoded data blocks. A common method is to look for bounding boxes of connected components, and to select only those bounding boxes that are sufficiently large, thus eliminating the "noise" pixels.

Once the candidate bounding boxes have been located, a verification operation is needed to ensure that encoded data blocks have been identified correctly. Using the original input image being decoded, in each region identified in the first step, the connected components in the original image are found and their sizes and locations are analyzed. (The definition of a connected component is provided below.) This analysis includes determining whether the connected components are all about the same height and have widths that vary between expected limits. One way in which this may be accomplished is to take the bounding box around each connected component and shrink it by two pixels in each direction, to produce a smaller bounding box. When a connected component is an encoded data block, this reduced-size bounding box has eliminated the most common variabilities introduced by image capture noise and should be a solid rectangular block of foreground color pixels. In addition, this analysis should determine whether the connected components are organized in a two-dimensional pattern, with parallel components laid out as if they were sitting on parallel horizontal lines. Another useful piece of analytical information is to produce the variance of the horizontal and vertical run lengths in each connected component; the less variance found in each block, the more likely it can be concluded that a candidate region is an encoded data region, since text regions that have been reduced and not replaced with the regular encoded data blocks are likely to show more variance in the vertical and horizontal run lengths of the connected components. Various histogram techniques may be used to develop the data needed for this analysis. It is also useful to extract the median length (or height, if height encoding is used) from the data developed during the variance analysis; as will be seen below, the median value may be used to assign a data value to each block for purposes of decoding.

The verification process may include locating the beginning or end of line markers. As noted previously, the beginning or end of the horizontal rows of encoded data blocks may be encoded with specific line-start or line-end markers that are all of an identical shape. These markers are designed to be easily distinguishable from the encoded data blocks, and make detection of the region in iconic image 20 that contains the encoded data a more straightforward operation.

2. Assigning Quantized Values to the Encoded Data Blocks Using Histogram Analyses.

Once the bounding box of each encoded block region is determined, the operation of decoding the binary data from the blocks within each bounding box follows next. The regions verified to contain EDBs can be extracted from the image (i.e., copied to another image) for further analysis and for decoding the information from each region individually. The size and position of each encoded data block in an encoded block region needs to be determined in order to decode the message embedded in the region.

Connected components are identified in each encoded block region, in box 320 of FIG. 11, and the bounding boxes of each connected component is determined. For purposes of establishing a common terminology framework for discussing the present invention, image locations such as pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used. An "edge" occurs in an image when two neighboring pixels have sufficiently different pixel values according to an appropriate criterion for the occurrence of an edge between them. The term "edge pixel" may be applied to one or both of two neighboring pixels between which an edge occurs. A set of pixels in an image is "connected" if each pixel has at least one neighboring pixel that is in the set and if each pair of pixels in the set are connected by a subset of other pixels in the set. One or more connected set of pixels bounded by an edge may be called a "connected component".

Each connected component roughly represents an encoded data block, but for decoding purposes, much more accurate information is needed about the size of each block. In particular, statistical data are collected about each encoded data block for the purpose of assigning a block length, block height and vertical "baseline" position to each block. The statistical data to be collected includes the distribution of block lengths, block heights and vertical locations of the blocks, all in units of pixels. These distributions are typically presented in the form of histograms. Data indicates a "distribution" of an image characteristic when it has a value that depends on a number of measurements of the image characteristic. For example, data can indicate a distribution of distances or of measurements of another scalar quantity by indicating the central value of the measured distances; a measure of the variance of the measured distances; or a measure combining the central value and variance. Data can also indicate a distribution of distances by indicating frequency of each distance or by indicating distances at which maxima of frequency occur. A "histogram" is data that indicates a distribution of an image characteristic by indicating frequency of occurrence of the values of the image characteristic. For example, if an image characteristic is measured over a range of magnitude or size, a histogram can indicate frequency as a function of the magnitude or size. The range can be divided into parts and the histogram can indicate the number of measurements occurring in each part. Thus a histogram can be used to find maxima of frequency, for example.

The lengths of the encoded data blocks are measured, in box 324, using the bounding box of the connected components; this type of measurement is likely to produce a distribution of lengths that center around certain prominent length values, called "quantized" lengths, with a variation of only a few pixels between the quantized lengths. For a more accurate measurement, the length and location of each pixel row is used to determine the median row length for the block, and a variance of the median row length measurement is also developed. In order to develop this more accurate measurement, the short run lengths in each connected component must be eliminated. These short run lengths are runs that do not extend the full length of an encoded data block as a result of noise introduced by the scanning operation. Three methods can be used to accomplish this: one or more pixel rows near the top and bottom of each connected component may be discarded; or runs of foreground color pixels having a length less than a small value shorter than the longest run may be eliminated; or both of these conditions may be implemented.

This measurement process also produces a distribution of lengths that center around quantized block lengths. The accuracy (or reliability) of this measurement is inversely related to the size of the variance in the measurements. The best values for each quantized length to be assigned to encoded data blocks are then determined from this distribution data. This is typically done by taking the median size for those measurements determined to be from blocks at each row length.

Quantized values of the block heights and the vertical locations (i.e., a "baseline" position of a row of encoded data blocks) of the rows of encoded data blocks are developed in a manner similar to that of the block lengths, in boxes 326 and 330 of FIG. 11, since the uniform and regular placement of the rectangular blocks during encoding suggest that these values are expected to differ by only one or two pixels between blocks. To measure the block heights and vertical locations most accurately, each pixel column in a connected component is measured, and the median and variance are then used to determine the data value and its reliability. Pixel columns near the left and right edges are discarded because they may not extend the full height, again resulting from the introduction of scanner noise. Again, the best value(s) for quantized block height(s) are determined. For encoded data blocks that have been encoded having the same block height, a single quantized block height level is expected.

3. Decoding the Message from the Quantized Data Values.

These quantized values are then used to assign data values indicating the quantized length, height, and vertical block position of each block, in box 334. The values of data blocks that do not contain encoded data, such as blocks that are added to give line justification, are discarded, in box 338, from the data to be used to extract the encoded message. The values assigned to the encoded data blocks are then ordered, in box 340, as the encoded data blocks are ordered in the encoded block region —by line and by sequential position within each line. These ordered values of lengths of foreground colors and their positions provide the message bit pattern of 0's and 1's from which the data message can be decoded; this message bit pattern is then produced in box 350. Finally, the data message is decoded from the extracted message bit pattern, in box 360, using formatting information about the encoding operation.

The format of the encoding operation specifies whether there is parity or other error correction code data, as well as whether there is "meta-data" about the message, such as the number of bytes in the encoded message or the number of encoded "text" lines in the iconic image, or other information about the encoding format or about the encoded message. Some aspects of the formatting must be known a priori; while others can be determined from the data. For example, the data encoded in the height and vertical location of the blocks can be known to specify meta-data—that is, data about the message, such as the amount and type of ECC that has been appended. This formatting information is used to identify and verify the bits that carry the data message; these bits can then be decoded; in many cases, a lookup table of selected, or of all possible, bit patterns with corresponding decoded data bits, may be used to complete the decoding operation.

In order to decode a message encoded in the heights and vertical positions of the encoded data blocks rather than, or in addition to, in their lengths, the decoding steps of FIG. 11 are essentially carried out in the same manner, with the additional step of establishing a reference baseline and topline for each horizontal line of connected components, in order to then determine the amount of shift above or below these reference points during decoding Thus, each line of connected components is assigned a reference baseline and topline when data values are assigned to each connected component in box 534. Decoding then proceeds as illustrated in FIG. 11: a message bit pattern can be determined from the height values as ordered by encoded data block and their respective displacements from the reference baseline and topline in each line. The data message can then be decoded from the extracted message bit pattern.

Reference baseline and topline positions must be specifically encoded. Two techniques are suggested: the line-start or line-end markers, when used, may be specifically added to lines of encoded data blocks at the reference baseline or topline position, or may establish both positions; or one or two special-purpose EDBs may be added in each line that have a fixed, reference height. For example, the first and last EDB in each line can have fixed top and bottom raster positions that provide the reference for top and bottom lines in all EDB for that line. A combination of fixed position encoded data blocks and line-start or line-end markers may also be used to mark the reference topline and baseline. The decoding operation can take advantage of this information, if it is known in advance, or the reference blocks can be detected using image processing operations.

D. Applications of Iconic Images in Document Image Management Operations

FIGS. 13-19 illustrate various examples of applications of iconic images in document image management operations. These examples are intended to be illustrative only, and not exhaustive of all possible types of operations, and each example is itself subject to variations that will be apparent to those of skill in the art from the descriptions that follow.

1. Retrieving a Text Document Image from a Data Base Using Location Identification Data Encoded in a Representative Iconic Image.

Figure 13:
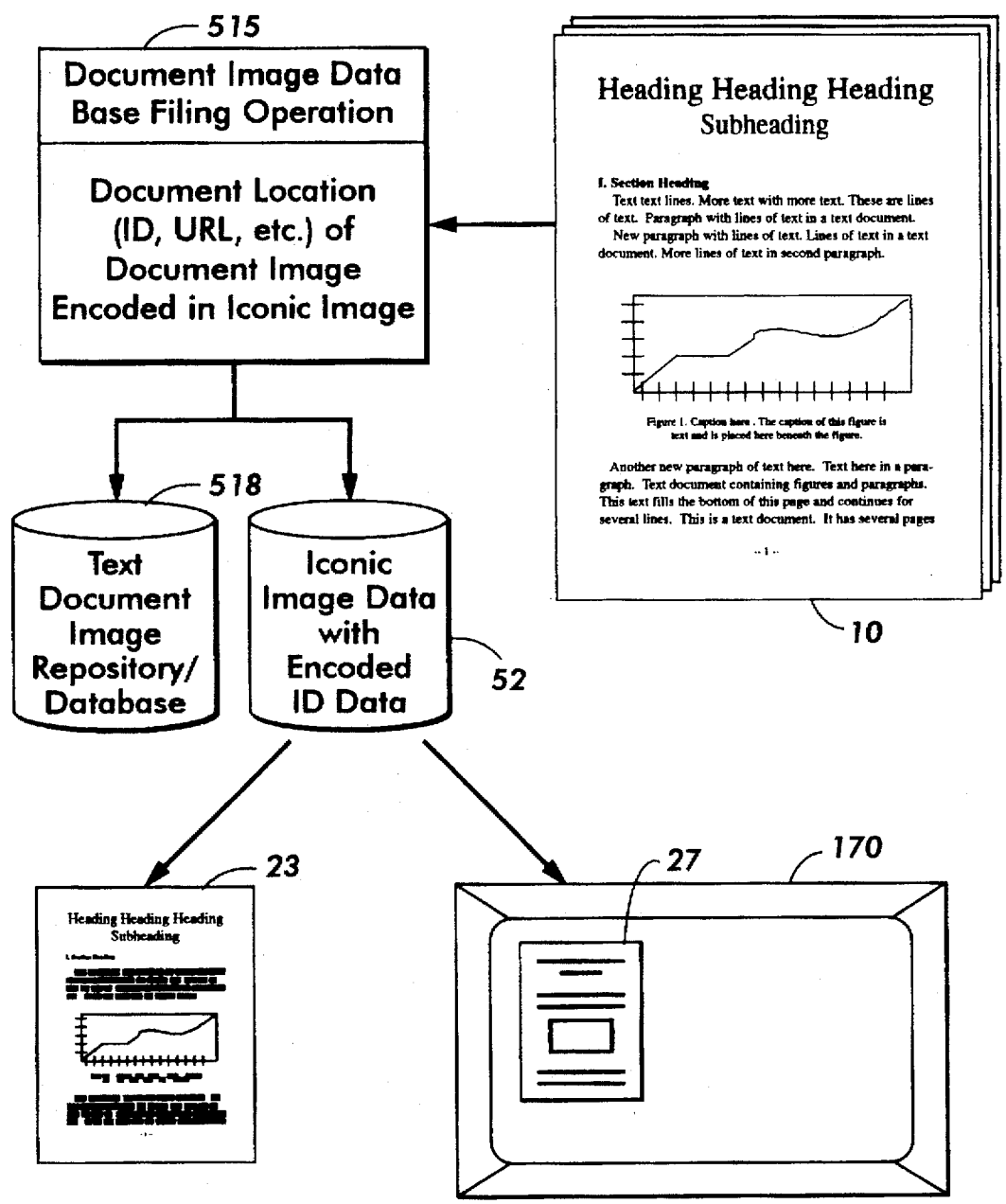
FIG. 13 is a block diagram illustrating a data base filing operation that includes an encoding operation to produce an iconic image version of a text image document.
Figure 14:
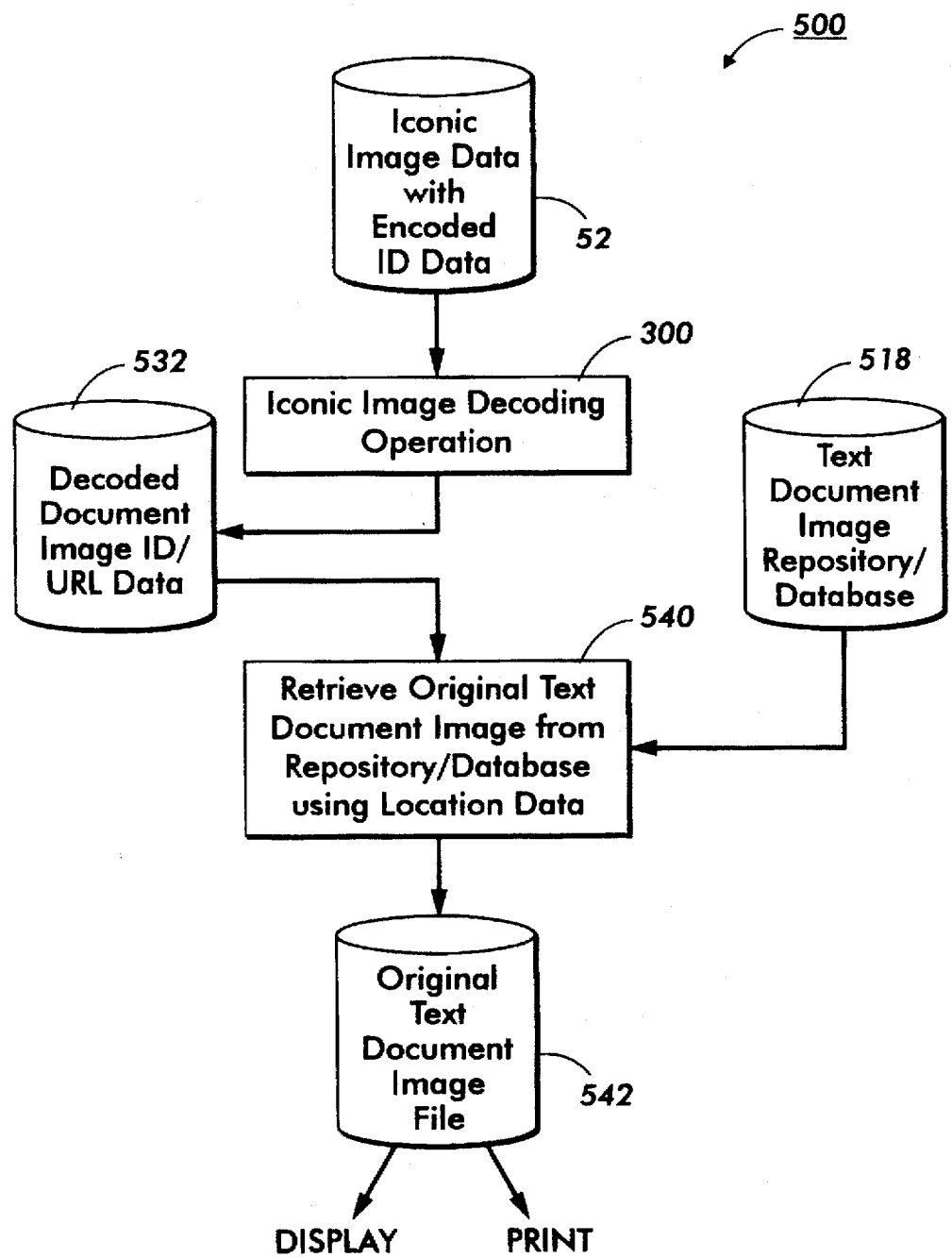
FIG. 14 is a flowchart illustrating an embodiment of the present invention for performing a data base retrieval operation to locate a text image using location identification data encoded in an iconic image version of the text image according to the operation shown in FIG. 13, and decoded according to the present invention.

FIG. 14 illustrates document image management operation 500 for retrieving a displayed or printed version of an original text image from a document image data base or other repository, using location identification information encoded in an iconic image representation of the full-size version of the original image. FIG. 13 illustrates operation 515 for creating the document image data base, and for producing and encoding the iconic image having the proper location identification information. A plurality of text documents, including text document 10 of FIG. 3, are provided as input to operation 515 which then loads them into a data base or repository. Operation 515 also generates identifying location information for each document that is stored. Operation 515 then produces an iconic image version of each full-size original text image and encodes the identifying location information in the text regions of the iconic image according to the processes described in the previously referenced Iconic Image Encoding application. Operation 515 produces the text document image data base 518 and the iconic image data 52 with the encoded identification location information as outputs. Iconic image data 52 may be subsequently printed as iconic image 23, or displayed as iconic image 27 on a display device.

In document image management operation 500 of FIG. 14, iconic image data 52 is provided as input to decoding operation 300, and produces decoded document image location identification data 532, which is then input to a retrieval operation 540. Retrieval operation 540 locates the requested document image in repository 518 using the decoded location identification data 532, and produces the original text document image file 542, which may then be displayed or printed as requested.

In one embodiment of operation 515 of FIG. 13, document images are loaded into a document image repository located on a server that is accessible via the World Wide Web (WWW). Each document contains a unique identifying location known as its Uniform Resource Locator, or URL. A document image may be retrieved from document image repository 518 by sending the server a request with the document's URL. The identifying URL data is encoded in the iconic image version of the original document image, such that each iconic image serves as an index into the document repository for locating a particular document.

The indexing capability of each iconic image generated by operation 515 may then be exploited in a number of different ways in this embodiment. For example, a hardcopy printed version of all iconic image versions of documents stored in repository 518, much like document 188 of FIG. 5, may serve as a complete, secure, lightweight, and portable index into the data base. A user who possesses a copy of the iconic image index and who has access to the WWW may simply select one of the images by marking it with a circle or "X" or other identifying selection mark, and scan the document as shown in FIG. 5 to produce iconic image data 52 of FIG. 14. Decoding operation 300 and retrieval operation 540, stored on the server, or otherwise associated, with document repository 518, accept iconic image data 52 as input and perform the retrieval of the desired document as previously described, displaying the retrieved document image for viewing or printing by the user. Because the URL data is encoded in each iconic image, there is no perceptible identifying information about the documents on the hardcopy index. Moreover, the encoding is robust enough to permit copies of the portable index to be easily made, and to permit robust and reliable decoding from an image that may be contaminated with noise from a physically dirty document.

2. Enhancing the Performance of Character Recognition Operations on a Text Document Image Using Data About the Image Encoded in a Representative Iconic Image.

The iconic image of the present invention may also be used in contexts where electronic data structure versions of documents are not readily available, and printed documents are frequently expected to be used as source documents to produce electronic versions of document data structures using a character recognition operation. Here, the iconic image may be used to encode data for use by a character recognition operation, to enhance the performance of the recognition operation. In this context, the iconic image serves to make the printed document a more reliable source of information.

Figure 15:
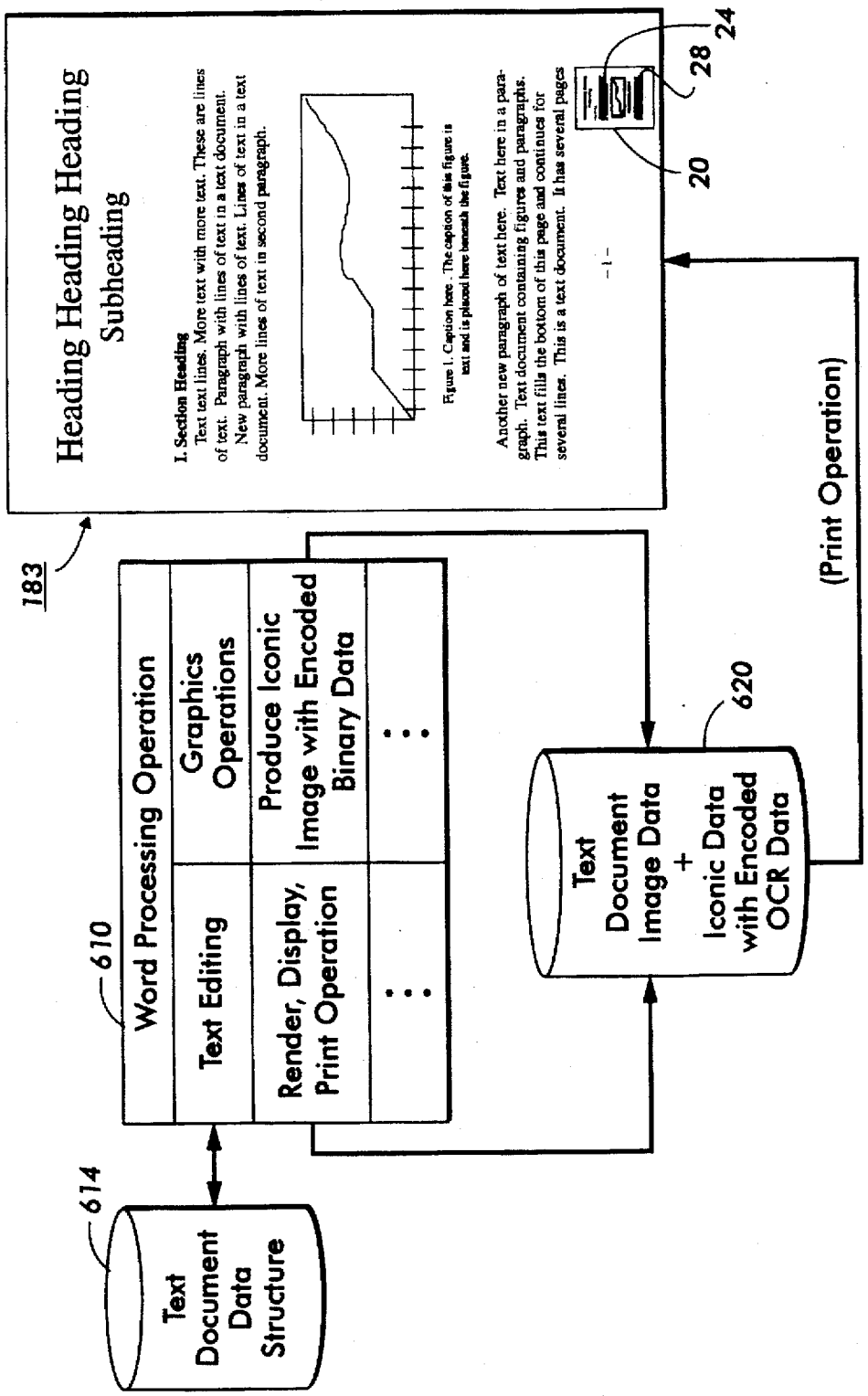
FIG. 15 is a block diagram that illustrates a word processing operation that includes an encoding operation to produce an iconic image version of a text image document.

FIG. 16 illustrates character recognition operation 600 for performing character recognition on a text document image to generate a transcription of the text image; operation 600 makes use of information encoded in an iconic image representation of the full-size version of the original image in order to improve the accuracy of the recognition operation. FIG. 15 illustrates word processing operation 610 which is a conventional word processing operation with the added capability of producing and encoding an iconic image version of the document being produced by operation 610. A user of operation 610 edits a text document that is represented by text document data structure 614 using the conventional editing features of word processing operation 610. At the conclusion of document editing, operation 610 has the available function of producing an iconic image version of the text document image that includes data about text document 614 encoded in the text regions of the iconic image according to the processes described in the previously referenced Iconic Image Encoding application. The iconic image may, but need not, have lines in correspondence with the text lines of the actual document. For example, each line of the iconic image may hold data about the corresponding line of the document. The type of information that may be encoded includes information such as a page count of the document, a word and line count on each page of the document, a word count on each line on that page, or the word lengths of the words on each line on a page of the document. There may be a different iconic image produced for each page of the text document being produced, or there may be simply one iconic image for the entire document, depending on the amount of information that needs to be encoded. Operation 610 then produces as an output data structure a text document image file 620 which includes the text document image rendered from data structure 614 and the iconic image produced by the iconic image encoding feature of operation 610. The text document with the iconic image may be subsequently printed as document 183. Iconic image 20 printed on document 183 includes the embedded encoded data that is useful for character recognition is regions 24 and 28.

With reference now to FIG. 16, when printed document 183 is scanned, as shown for example in FIG. 4, the text document image data with the iconic image having the encoded character recognition data is produced as output and is then input into decoding operation 300. The decoded data 632 is then input to a character recognition operation 640 along with the text document image data 620 for use in performing recognition on the text document image, to produce a transcription file 642 of the text image. Character recognition operation 640 includes functionality that uses decoded data 632 to verify portions of the transcription to improve its accuracy. For example, if decoded data 632 includes a word length for each word on each line in the document image, these word lengths can be compared to the length of the words produced by the character recognition operation in each of the lines in text document image 620; image areas in a particular line that may have been degraded by noise or that otherwise produce unrecognizable characters are more likely to be correctly recognized when these word lengths for words on the line are known a priori.

While FIG. 15 has illustrated the functionality of producing the iconic image having the encoded recognition data as being included in a word processing operation, it is readily apparent that this functionality may exist as an independent function, or as part of a different document management function. The word processing operation is a logical, but not the only, place to include this functionality.

3. Performing Document Authentication using a Representative Iconic Image to Store a Digital Signature.

Another important application of the present invention is document authentication. The authenticity of the contents or the sender, or both, of an electronic or even of a printed distribution of a document is becoming increasingly important as technology provides easier methods to forge or change documents without detection. Digital signature technology serves to authenticate one or both of the content or sender of a document image, and the iconic image of the present invention may be used as means to encode a digital signature in an unobserved manner; when the digital signature is decoded from the iconic image, it can be used to authenticate an accompanying, or a separately acquired, document image.

A "digital signature" is a transformation of a message using an asymmetric (public-key) cryptosystem such that a person having the initial message and the signer's public key can accurately determine: (a) whether the transformation was created using the private key that corresponds to the signer's public key; and (b) whether the message has been altered since the transformation was made. A digital signature is essentially a cryptographic checksum that is computed as a function of input message data and a user's private key; thus, a user's digital signature varies with the message data being "signed". Due to the efficiency drawbacks of public-key cryptography, a user often signs a condensed version of a message, called a message digest, rather than the message itself. A digital signature is created by running message text through a hashing algorithm to yield a message digest. The message digest is then encrypted using the private key of the individual who is sending the message, turning it into a digital signature. Message digests are generated by a hash function that is a one-way function to the text of the electronic message to be sent. A hash function is a keyless transformation function that, given a variable-sized message as input, produces a fixed-sized representation of the message as output (i.e., the message digest). Because the hash function is considered to be secure, signing a message digest provides the same security services as signing the message itself. Because the message digest is derived from the message, each message produces a unique message digest.

Digital signature software encrypts the message digest and the hash function using an asymmetric cryptosystem and the sender's private key. The encrypted digest and oneway function are attached to and sent along with the message to the intended recipient. The sender's public key may also be attached to the message as well, if it is not otherwise available to a recipient. Software on the recipient's computer system then uses the sender's public key to decrypt the message digest and one-way function, and applies the one-way function to the message to recalculate the message digest. If the recalculated message digest matches the original digest, then the recipient has accurate and reliable verification that (a) the message was not altered in transmission or tampered with, and (b) the originator—i.e., the owner of the private key paired with the public key—sent the message. Verification that the message has not been tampered with is reliable because if the message is changed after the original digest is created, the new digest will not match the original one that the sender created and attached to the message. Verification that the originator sent the message is reliable because public key transformation functions are 1-way (i.e., not forgeable); only the sender's public key can decrypt a message that was encrypted with the sender's private key. Thus, although a digital signature is not a handwritten signature, the processes of creating a digital signature and verifying it provide electronically at least the same effects—if not more—that a handwritten signature on paper provides. That is, a digital signature functions to ensure that a message is authentic, its integrity has not been compromised, and the sender cannot disavow or repudiate the message after sending it.

The present invention may serve as an aid in reliably providing the sender's public key by providing the capability of encoding the public key unobtrusively in the iconic image, along with the digital signature. The public key and digital signature could then travel with the document in any form the document took, and would always be available for authentication. Even if the public key is not encoded, and is provided from a trusted repository, the digital signature, when encoded in an iconic image version of the document which is printed on the document, would always travel with the document image.

Digital signatures are typically discussed in terms of authenticating messages in the form of conventional text, and in this context, the original message text must be available for authentication purposes. In many document image management tasks, however, the original message text in an electronic code form such as ASCII is not available. However, technology has been developed to apply the principles of digital signatures to digital images. The Digimarc™ technology discussed above appears to apply the principles of digital signatures to images by altering some quantity of image signals in an original image to encode data about the image. See also O'Gorman. and Rabinovich, "A Pattern Recognition Approach to Photo-ID Authentication", *International Conference on Pattern Recognition (ICPR '96)*, Vienna, Austria, August 1996 (hereafter, the "O'Gorman and Rabinovich paper"), which discloses a process for producing a "photo-signature" that is a concise representation of a photographic image on a document. The photo-signature is determined by pattern recognition techniques applied to the image data; the photo-signature is either stored in a data base for later authentication purposes, or it is stored on the document itself in an encrypted form; this latter form of authentication is referred to as self-authentication. The O'Gorman and Rabinovich paper is incorporated by reference herein for all that it teaches.

Figure 17:
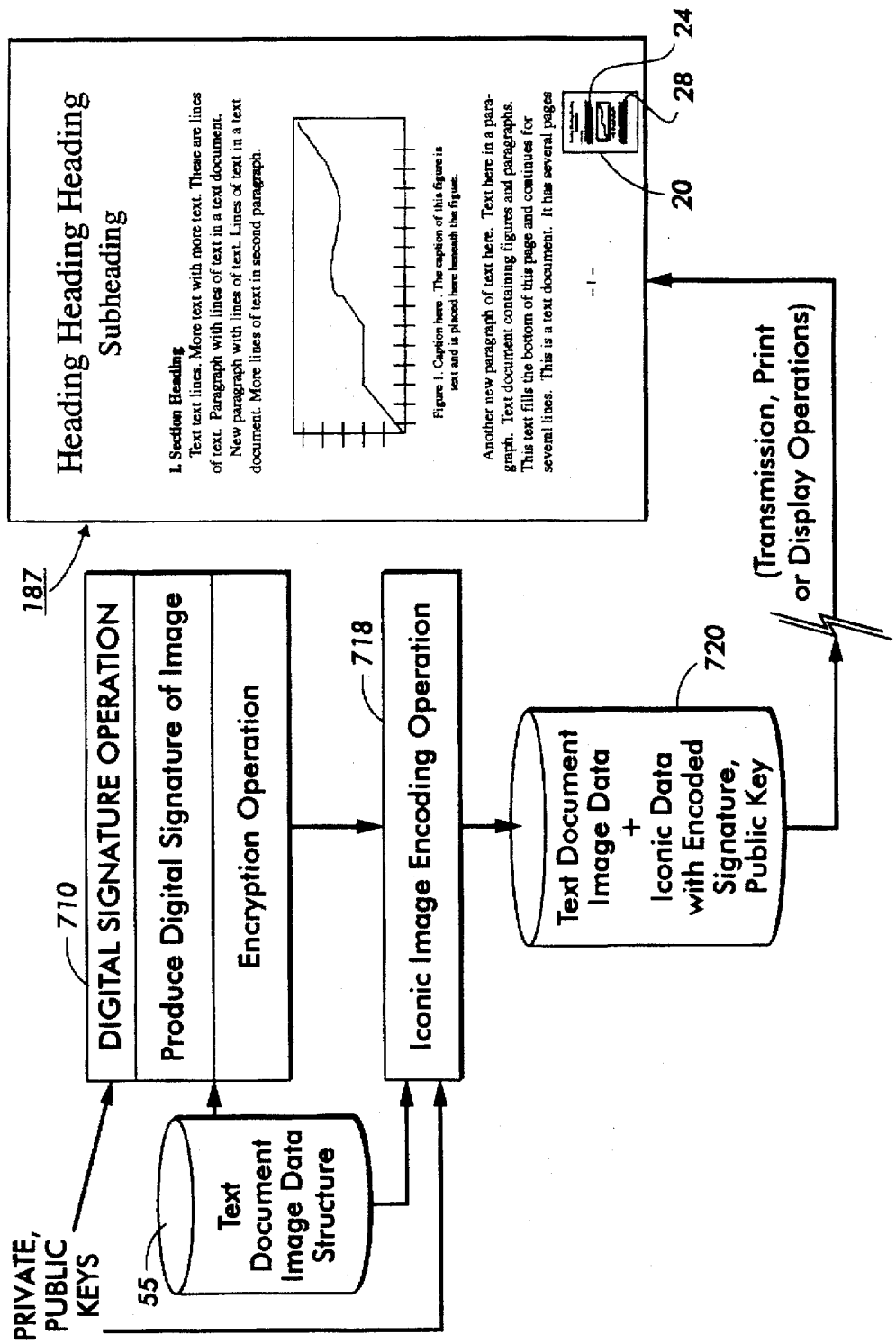
FIG. 17 is a block diagram illustrating a digital signature production operation and an iconic image encoding operation to produce an iconic image version of a text image document that contains a digital signature of the document image.
Figure 18:
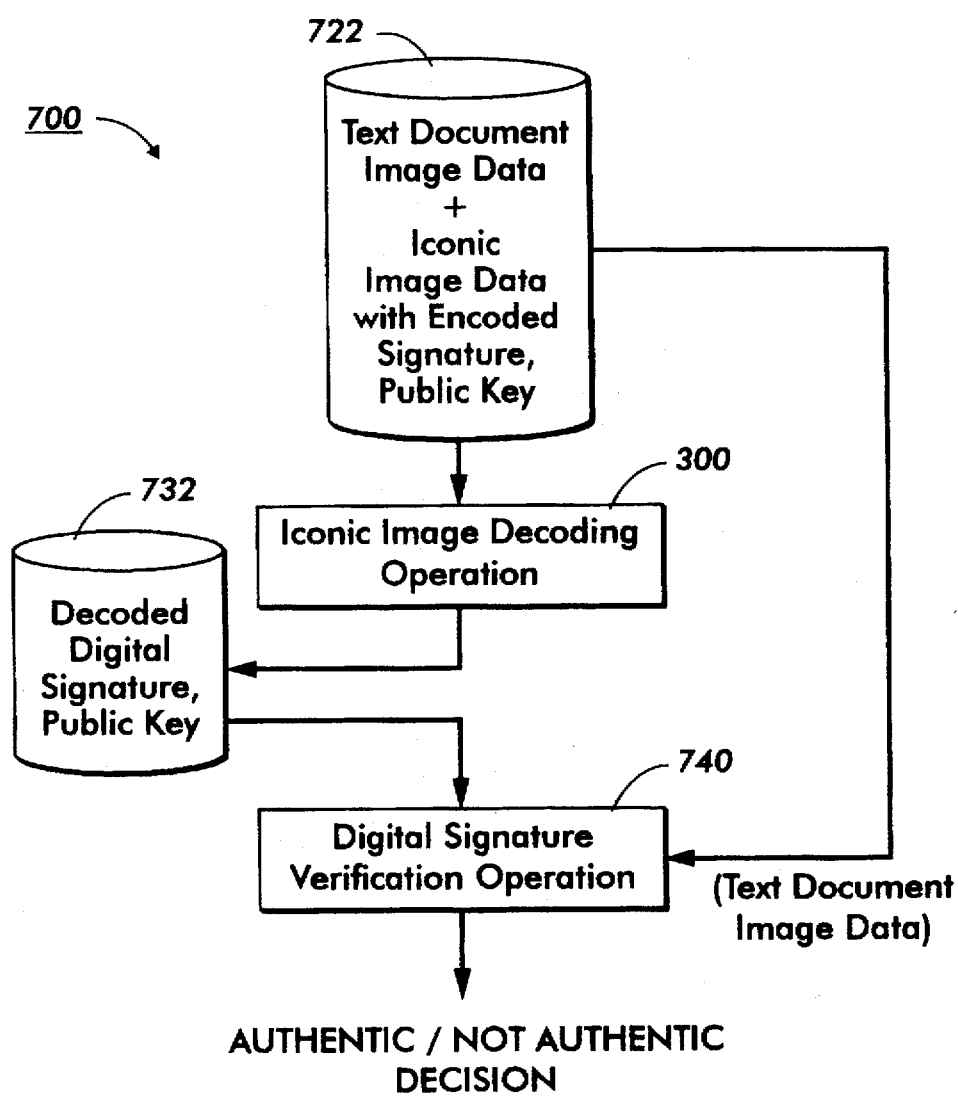
FIG. 18 is a flowchart illustrating an embodiment of the present invention for performing a digital signature verification operation to authenticate an input text image using digital signature data encoded in an iconic image version of the text image according to the operation shown in FIG. 17, and decoded according to the present invention.
Figure 19:
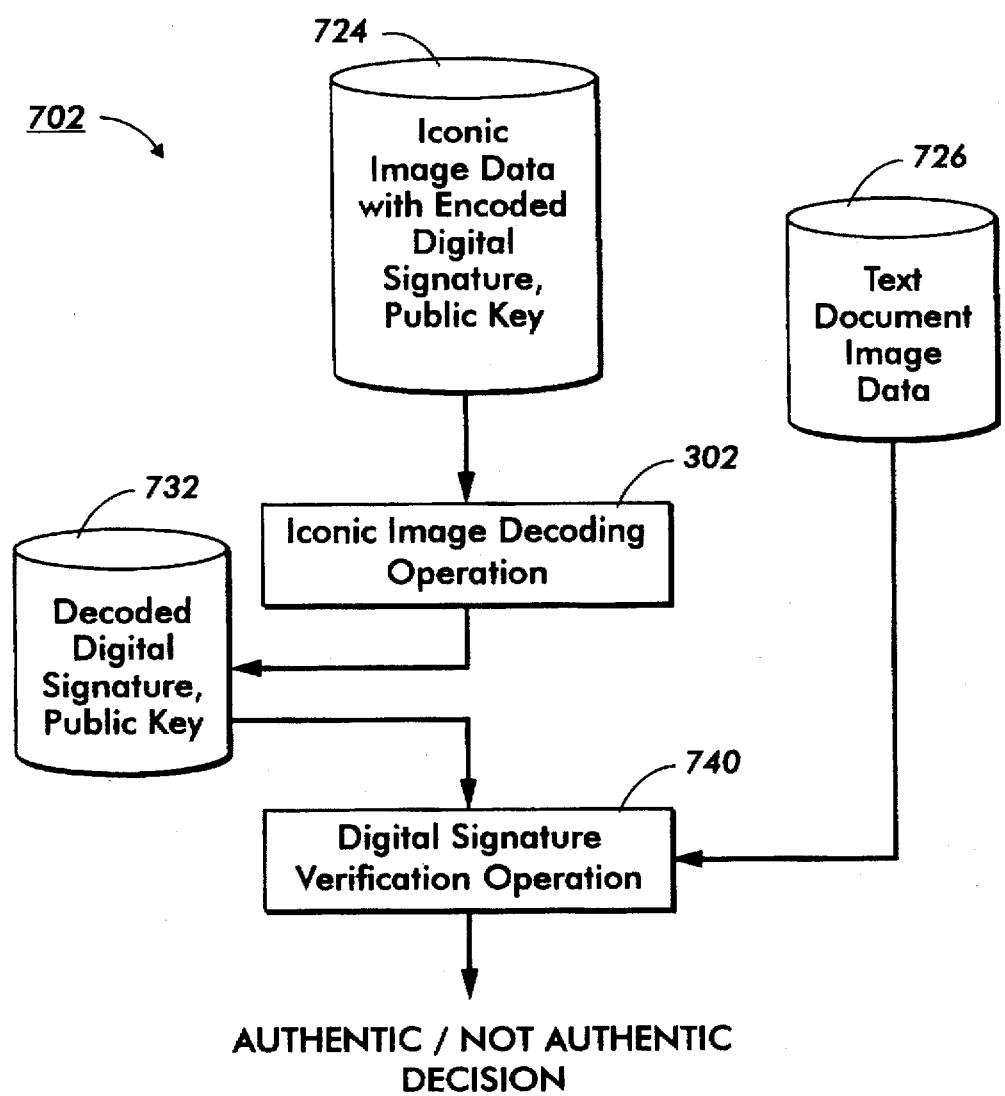
FIG. 19 is a flowchart illustrating a variation of the embodiment of the present invention shown in FIG. 18, where the iconic image and the original text image are received from separate sources.

FIGS. 17, 18 and 19 illustrate two embodiments of the present invention for self-authenticating a text document image using a digital signature of the type proposed in the O'Gorman and Rabinovich paper. With reference to FIG. 17, digital signature operation 710 provides the ability to produce a digital signature for the text document image represented by data structure 55 of FIG. 7 which is the document image of document 10. Using the terminology in the O'Gorman and Rabinovich paper, a photo-signature of the image content of document image file 55 is first produced using one of the pattern recognition methods described. These methods generally involve dividing the image into a grid of squares and deriving a number for each square; the number derived depends on the average darkness of the square and that of its neighboring squares. These numbers are collectively the photo-signature and are then used to represent the content of the image. As in the text domain, the same technique is used on the image presented for authentication to produce a target photo-signature which would be compared to the original photo-signature. As long as the image may be consistently divided into essentially the same squares, the same photo-signature will be produced.

While the photo-signature technique is described in the O'Gorman and Rabinovich paper in the context of a photographic (continuous tone or halftone) image, the technique may be adapted to adequately represent the content of a text image as well, and the term "photo-signature" as used in the context of the description of the example illustrated in FIGS. 17, 18 and 19 is intended to include a digital signature for an image that contains text. For example, for a binary image, the number derived for a square may be a "gray" value derived from the fraction of black pixels in a N×N square. Or, the number of edge pixels at various orientations may be used to produce a number for a grid square. Once this type of measure of the content of a square is determined, the elements of the digital signature may be derived by one of the methods proposed in the O'Gorman and Rabinovich paper (e.g., comparing with neighboring values), or by a modification thereof.

The methods proposed by O'Gorman and Rabinovich require registration marks on the document in order to generate rectangular (or square) regions of the image in a completely repeatable and reliable fashion because some scaling, skew and arbitrary translation may occur when the image is scanned. Three registration points are the minimum required if the transformation is affine (a linear transform with translation, rotation and uniform scaling).

In the self-authentication option proposed in the O'Gorman and Rabinovich paper, the photo-signature is then encrypted using an encryption operation and using the private key of the sender or document originator. After the encrypted photo-signature is produced, iconic image encoding operation 718 produces an iconic image version of the text document image with the encrypted photo-signature, the function used to produce the signature, if necessary, and, optionally, the sender's public key encoded in the text image regions of the iconic image according to the processes described in the previously referenced Iconic Image Encoding application. Then, assuming the document image with its digital signature is going to be transmitted or otherwise used in its image form, a rendering operation (not shown) produces a file 720 of the text document image data representing document 10 with the iconic image data having the encoded photo-signature, the signature function, and the optional public key of the sender. When file 720 is subsequently transmitted, received and printed or displayed, document 187 includes iconic image 20 with the digital signature data encoded in regions 24 and 28. Operations 710 and 718 may be implemented as separate software programs or as one combined operation.

Digital signature verification operation 700 illustrated in FIG. 18 follows much the same pattern as the previously described embodiments of document image management operations. Document 187 of FIG. 17 is scanned in the manner described in FIG. 4, and the document image data 722 is provided as input to iconic image decoding operation 300, which decodes the binary data encoded in the iconic image region of document 187 to extract the photo-signature, and the signature function and the public key, if these are provided. This decoded data is then input to digital signature verification operation 740, along with the text document image data portion of image data 722. Verification operation 740 is related to operation 710: operation 740 produces the photosignature for the text document image data that was actually received, referred to as the first digital signature, in the same manner as operation 710, using the decoded signature function; operation 740 then decrypts the decoded photo-signature using the public key, referred to as the second digital signature. The first and second digital signatures are then compared, and if they are identical, or close within some predetermined threshold, the document is determined to be authentic. FIG. 19 illustrates operation 702 which is a variation of operation 700 that allows for the receipt of document text and iconic images from separate sources.

In a variation of the digital signature application just described, an iconic image may be used to carry identifying information about one or more attributes of the text document image—referred to as "meta-data"—that is not derived from or dependent on the content of the image and is thus not a digital signature per se. This information may be encrypted using the private key of the sender or document originator—who presumably is the only source of the private key. This encrypted information may then be encoded in the iconic image. In addition, the iconic image may be produced using a very faithful reproduction and encoding technique such that the iconic image clearly and distinctly shows the appearance of the document image it represents. The iconic image in this embodiment serves as what might be called a "weak" authentication of the original text image: if the iconic image visually appears substantially similar to the original document and the decoded data from the iconic image is successfully able to be decrypted using the public key, it can be reliably determined that the sending authority in possession of the private key sent the document image carrying the iconic image, even if the content of the image cannot be authenticated. Verification of the sending authority alone will be sufficient in some applications to authenticate the document, and thus the operation of producing the photo-signature may be eliminated.

4. Iconic Images Used as Document Tokens

As noted earlier, an iconic image need not be the reduced size version of a specific text image, but rather may be a reduced version of a text document image that is representative of a class, or genre, of text document images. Category 458 in FIG. 2 refers to this use for an iconic image; when an iconic image is used in this manner, it may be generally characterized as a "document token." An example of such a use may be described with respect to modified versions of FIGS. 13 and 14. Text document images such as image 10 may be cataloged and stored in a document repository according to the document class they belong to. So, for example, document repository 518 may hold academic journal articles by various authors, business letters, project correspondence, and other conventional types of documents used by a typical business. An iconic image may be generated by operation 515 for each class of document in repository 518, together with title and location identifying information for each document in the class, or for a subset of documents in the class, when input data is provided to operation 515 as to how to select the subset. Decoding of the iconic image in operation 500 of FIG. 14 would then permit, or restrict, access only to those documents encoded in the iconic image. Possession of an iconic image, then, would provide the holder of certain document privileges with respect to the documents in the repository.

5. Other Document Image Management Applications Using Iconic Images.

A variety of different types of information may be encoded in the iconic image related to the use and distribution of either the full-size original image or the iconic image. For example, the iconic image may store encoded information related to when the iconic image was produced, such as a time stamp, or identifying information about the owner of the full-size image or the owner of the machine that generated the iconic image.

The possessor of the iconic image may have certain usage rights encoded therein pertaining to the use of the original image, such as whether it can be distributed to others, whether it can be printed, and how many copies may be made. In a commercial usage rights system, an iconic image might be purchased with certain rights encoded in it to permit control over access to certain document repositories. For example, a full-size image may show an abstract or review of a longer document, article, or book. The iconic image that represents the full size image contains the usage rights the possessor of the iconic image has with respect to access to the complete document.

An iconic image may serve as a convenient and unobtrusive storage mechanism for cross-references to the locations of other information. For example, an iconic image version of a bibliography of references could store, for each reference in the bibliography, a data base file name or other identifying location information of the location of the full text of the reference. When the iconic image is scanned and decoded, these references are available to a user for retrieval and viewing. In combination with the encoding of usage rights information in the iconic image for each reference, the decoded information may also further specify whether a particular reference is able to be printed or transmitted to another location.

E. The Machine Environment of the Invention

Figure 20:
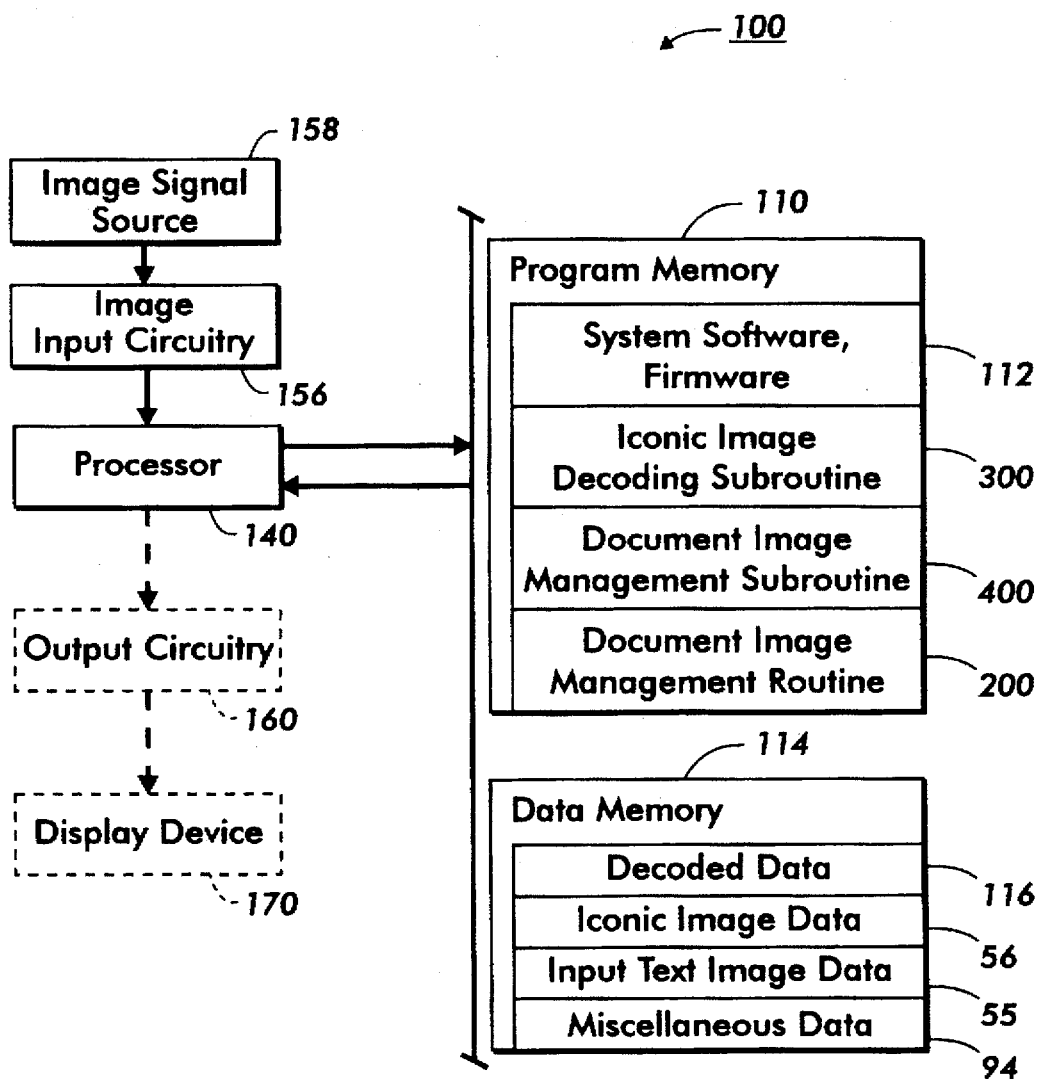
FIG. 20 is a simplified block diagram illustrating a machine in which the present invention may be used.

FIG. 20 is a block diagram of a generalized, processor-controlled machine 100; the present invention may be used in any machine having the common components, characteristics, and configuration of machine 100, and is not inherently related to any particular processor, machine, system or other apparatus. The machine or system may be specially constructed and optimized for the purpose of carrying out the invention, or it may comprise a general purpose computer selectively activated or reconfigured by a computer program stored in the computer, or it may be a combination of a general purpose computer and auxiliary special purpose hardware. When a machine such as machine 100 is suitably programmed to embody the present invention, the machine is not a standard or known configuration.

An image signal source 158 provides the input image data required by document image management operation 200. Image signal source 158 may be any image data capture device, such as a scanning device, a digital camera, or an interface device that produces a digital image definition data structure from another type of image signal. An input iconic image or an input text image with or without its iconic image provided by image signal source 158 is forwarded via image input circuitry 156 to processor 140 and may be stored in data memory 114.

Machine 100 may also include input circuitry (not shown) for receiving signals from a signal source (also not shown.) A particular document image management operation may require non-image data, shown as other data 58 in FIG. 1. Such sources include signals from another processor performing an operation, or signals from a memory device. This signal source may also include user interaction devices controllable by a human user that produce signals in response to actions by the user, such as a pointing device or a keyboard. Another type of user interaction device is a stylus device that the user moves over a special data collecting surface, which might be the display area of a display device (not shown). These input signals are also forwarded via input circuitry to processor 140 and may be stored in data memory 114. For some document image management operations performed according to the present invention, machine 100 includes a conventional display device 170 capable of presenting images, such as a cathode ray tube, a liquid crystal display (LCD) device, a printing device, or any other device suitable for presenting images. Display device 170 and its associated output circuitry 160 are shown as having dashed line outlines to indicate that these components may not be necessary in all implementations of the present invention.

Processor 140 operates by accessing program memory 110 to retrieve instructions, which it then executes. Program memory 110 includes document image management instructions 200 that implement the functions shown in flowchart 200 of FIG. 1. Program memory 110 includes instructions for the subroutines needed to accomplish the document image management task according to instructions 200. During execution of the instructions, processor 140 may access data memory 114 to obtain or store data necessary for performing its operations. Data memory 114 stores the image definition data structure 55 defining the original input image as well as the image definition data structure 56 defining the iconic image version. Data memory 114 also stores the decoded binary data 116 that is decoded from iconic image data 56 by decoding subroutine 300 of FIG. 11. Data memory 114 also stores various other miscellaneous data, including any other data 58 (FIG. 1) that is used by document image management operation 400 in addition to decoded data 116.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility (not shown.)

F. The Software Product of the Invention

Figure 21:
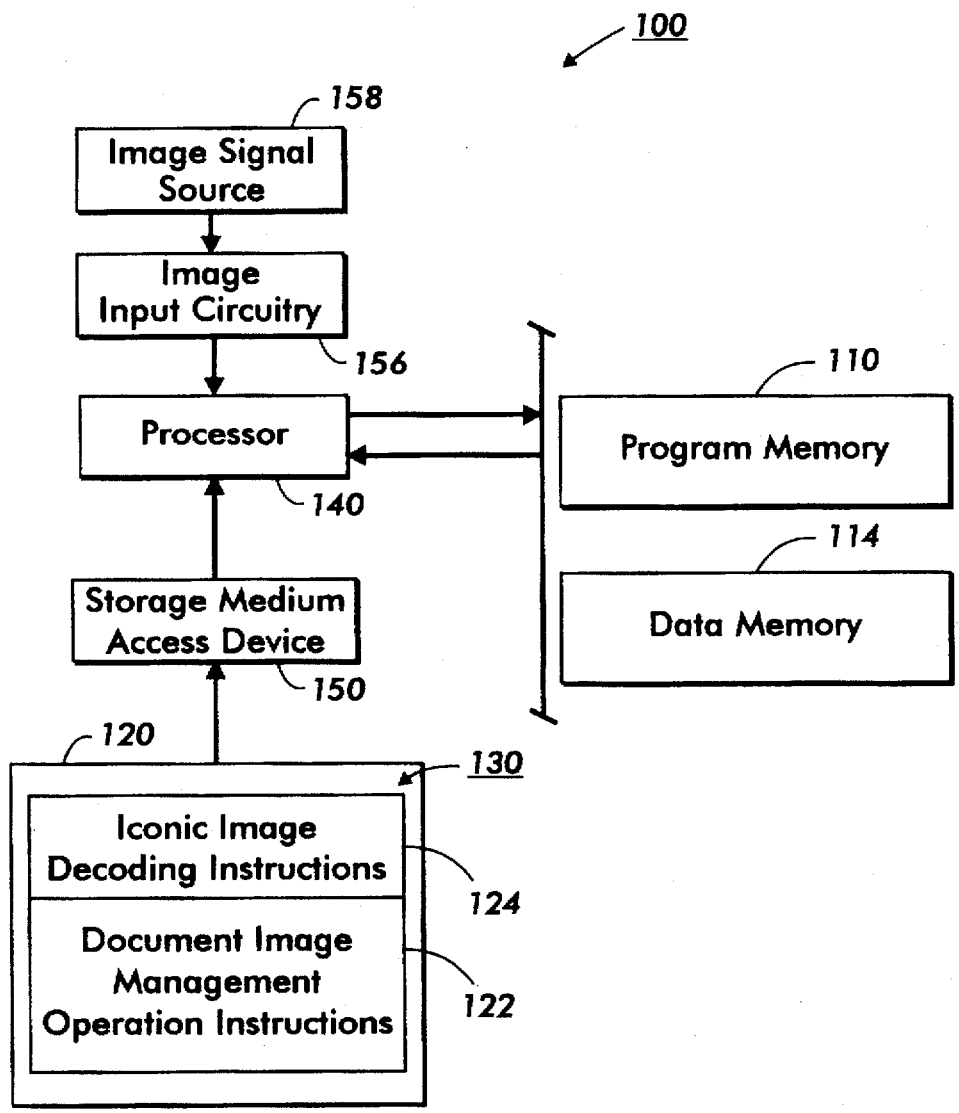
FIG. 21 is a block diagram schematically illustrating the software product of the present invention and its use in conjunction with a suitably configured machine.

FIG. 21 shows software product 120, an article of manufacture that can be used in a machine that includes components like those shown included in machine 100. Software product 120 includes data storage medium 130 that can be accessed by storage medium access circuitry 150. Data storage medium 130 stores instructions for executing the method of the present invention for performing a document image management operation using an iconic image version of an original input text image, as illustrated in FIG. 1, and may include instructions for performing the method according to one of the illustrated embodiments of the invention illustrated in the flowcharts of FIGS. 14, 15, 16, 18 and 19.

Software product 120 may be commercially available to a consumer in the form of a shrink-wrap package that includes data storage medium 130 and appropriate documentation describing the product. In that case, a data storage medium is a physical medium that stores instruction data. Examples of data storage media include magnetic media such as floppy disks, diskettes and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of disks storing a single body of data would be a storage medium. "Storage medium access circuitry" is circuitry that can access data on a data storage medium. Storage medium access circuitry 150 may be contained in a distinct physical device into which data storage medium 130 is inserted in order for the storage medium access circuitry to access the data stored thereon. Examples of storage medium access devices include disk drives and CD-ROM readers. These may be physically separate devices from machine 100, or enclosed as part of a housing of machine 100 that includes other components.

Storage medium access circuitry 150 may also be incorporated as part of the functionality of machine 100, such as when storage medium access circuitry includes communications access software and circuitry in order to access the instruction data on data storage medium 130 when data storage medium 130 is stored as part of a remotely-located storage device, such as a server in a networked client-server environment. Software product 120 may be commercially or otherwise available to a user in the form of a data stream indicating instruction data for performing the method of the present invention that is transmitted to the user over a communications facility from the remotely-located storage device. In the latter case, article 120 is embodied in physical form as signals stored on the remotely-located storage device; the user purchases or accesses a copy of the contents of data storage medium 130 containing instructions for performing the present invention, but typically does not purchase or acquire any rights in the actual remotely-located storage device. When software product 120 is provided in the form of a data stream transmitted to the user over a communications facility from the remotely-located storage device, instruction data stored on data storage medium 130 is accessible using storage medium access circuitry 150. Alternatively, a data stream transmitted to the user over a communications facility from the remotely-located storage device may be stored in some suitable local memory device of machine 100, which might be program memory 110, or a data storage medium locally accessible to machine 100 (not shown), which would then also be accessible using storage medium access circuitry 150.

Data storage medium 130 stores instruction data which is provided to processor 140 for execution when the method for producing an iconic image version is to be used. The stored data includes document image management operation instructions 122; when these instructions are provided to processor 140, and processor 140 executes them, the machine is operated to perform the operations for performing a document image management operation, as represented in box 400 of FIG. 1, or in boxes 540, 640, and 740 in the flowcharts of the illustrated embodiments in FIGS. 14, 15, 16, 18 and 19, respectively.

The stored data further include iconic image decoding instructions 124; when these instructions are provided to processor 140, and processor 140 executes them, the machine is operated to perform the operations for decoding an input iconic image, as represented in box 300 of FIG. 1, and in the flowchart of FIG. 11.

Although not shown in FIG. 21, the stored data stored on data storage medium 130 may further include data indicating encoding instructions for encoding an iconic image version of an original image according to the processes described in the previously referenced Iconic Image Encoding application; when these instructions are provided to processor 140, and processor 140 executes them, the machine is operated to perform an encoding operation, as represented in various flowcharts in the Iconic Image Encoding application.

The present invention performs a document image management operation using an iconic, or size-reduced, version of an original text image that has embedded in it encoded binary data indicating data for use by the operation. The encoded data is placed in the iconic image in the form of horizontal lines of rectangular blocks which appear to a viewer to be representative of the text portion of the original image that they replace. The iconic image is suitable for use in a wide variety of document processing applications, and several embodiments have been illustrated herein as exemplary of the types of uses that may be made of the present invention. These uses are characterized by the ability of the iconic image to function as a document surrogate for the original full size version of the image, or as a document token for a class of images, to enable unobtrusive, robust portable storage of data related to the image. While the invention has been described in conjunction with several embodiment, it is intended to embrace all modifications and variations that are apparent to those skilled in the art and that fall within the scope of the appended claims.

What is claimed is:

1. A method for operating a processor-controlled machine to perform a document image management operation using an iconic version of a text image, referred to as an iconic image, having encoded binary data embedded therein; the machine including an image signal source for receiving image data; memory for storing data; and a processor connected for accessing instruction data stored in the memory for operating the machine; the processor being further connected for receiving image data from the image signal source; and connected for storing data in the memory; the method comprising:

receiving image definition data defining an input iconic image from the image signal source; the input iconic image having an appearance to a human viewer of a reduced-size version of an original text image; the input iconic image including at least one image region including image definition data defining a plurality of rectangular blocks each having a foreground color and arranged in horizontal lines separated vertically by image regions of a background color; the rectangular blocks having the appearance of representing text in the original text image; the image definition data defining each rectangular block, referred to as an encoded data block, having a characteristic property that represents a portion of the binary data;

performing a decoding operation using the image definition data defining the plurality of rectangular blocks to produce the binary data encoded therein; and performing a document image management operation using the binary data produced by the decoding operation.

2. The method of claim 1 for operating a processor-controlled machine to perform a document image management operation wherein the original text image represented by the iconic image is a content-specific text image; and wherein the binary data embedded in the rectangular blocks and produced by the decoding operation indicates data related to the content-specific text image represented by the iconic image; the document image management operation performing an operation using the data related to the content-specific text image.

3. The method of claim 2 wherein the content-specific text image is stored in a memory device; wherein the document image management operation is a retrieval operation; and wherein the data related to the content-specific text image is memory location data indicating a data path to a memory location of the content-specific text image; the document image management operation using the memory location data to access and obtain the content-specific text image from the memory location thereof.

4. The method of claim 2 wherein the content-specific text image is received as an input text image; wherein the document image management operation is a digital signature verification operation; and wherein the data related to the content-specific text image is digital signature data indicating a digital signature for the content-specific text image; the document image management operation using the input text image and the digital signature data to authenticate the content-specific text image.

5. The method of claim 2 wherein the content-specific text image is received as an input text image; wherein the document image management operation is a document authentication operation for authenticating an authorized sender of the content-specific text image; and wherein the data related to the content-specific text image is encrypted data encrypted using a private key in possession of the authorized sender; the document image management operation using the input text image, a public key paired with the private key and the encrypted data to decrypt the encrypted data in order to authenticate the authorized sender of the content-specific text image.

6. The method of claim 2 wherein image definition data defining the content-specific text image is provided by the signal source with the iconic image and is stored by the processor in the memory device; and wherein the data related to the content-specific text image is content data related to the information content of the content-specific text image; the document image management operation using the content data to perform the operation using the content-specific text image.

7. The method of claim 6 wherein the document image management operation is a character recognition operation; and wherein the content data related to the information content of the content-specific text image indicates data for use in performing the character recognition operation on the content-specific text image.

8. The method of claim 2 wherein the iconic image is a document surrogate for the content-specific text image; the iconic image being used independently from the original content specific text image to represent the content-specific text image; the data related to the content-specific text image including identification data indicating identifying information about the content-specific text image.

9. The method of claim 1 for operating a processor-controlled machine to perform a document image management operation wherein the original text image represented by the iconic image is a content-specific text image stored in a memory device; and wherein the binary data embedded in the rectangular blocks and produced by the decoding operation indicates operation parameter data related to the document image management operation; the document image management operation performing an operation using the content-specific text image stored in the memory device; the document image management operation using the operation parameter data in performing the operation.

10. The method of claim 9 wherein the document image management operation is a distribution operation controlling distribution of the content-specific text image; and wherein the operation parameter data indicates an authorized destination of the content-specific text image.

11. The method of claim 1 for operating a processor-controlled machine to perform a document image management operation wherein the iconic image represents a non-specific text image indicating a class of document images; and wherein the binary data embedded in the rectangular blocks and produced by the decoding operation indicates operation parameter data related to the document image management operation; the document image management operation performing an operation using a respective one of the document images in the class of document images; the document management operation using the operation parameter data in performing the operation.

12. An article of manufacture for use in a machine that includes a memory device for storing data; a storage medium access device for accessing a medium that stores data; and a processor connected for accessing the data stored in the memory device and for receiving data from the storage medium access device; the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, receiving image definition data defining an input iconic image from the image signal source; the input iconic image having an appearance to a human viewer of a reduced-size version of an original text image; the input iconic image including at least one image region including image definition data defining a plurality of rectangular blocks each having a foreground color and arranged in horizontal lines separated vertically by image regions of a background color such that the rectangular blocks have the appearance of representing text in the original text image; the image definition data defining each rectangular block, referred to as an encoded data block, having a characteristic property that represents a portion of the binary data;

the processor, further in executing the instructions, performing a decoding operation using the image definition data defining the plurality of rectangular blocks to produce the binary data encoded therein;

the processor, still further in executing the instructions, performing a document image management operation using the binary data produced by the decoding operation.

* * * * *